United States Patent
Kim et al.

(10) Patent No.: US 10,595,013 B2
(45) Date of Patent: Mar. 17, 2020

(54) METHOD OF FORMING DYNAMIC MAXIMAL VIEWING ZONE OF AUTOSTEREOSCOPIC DISPLAY APPARATUS

(71) Applicant: KOREA INSTITUTE OF SCIENCE AND TECHNOLOGY, Seoul (KR)

(72) Inventors: Sungkyu Kim, Seoul (KR); Kihyuk Yoon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 87 days.

(21) Appl. No.: 15/869,504

(22) Filed: Jan. 12, 2018

(65) Prior Publication Data
US 2019/0058874 A1 Feb. 21, 2019

(30) Foreign Application Priority Data
Aug. 16, 2017 (KR) .................. 10-2017-0103605

(51) Int. Cl.
| | |
|---|---|
| H04N 9/47 | (2006.01) |
| H04N 13/368 | (2018.01) |
| G02B 27/22 | (2018.01) |
| G02B 27/00 | (2006.01) |
| H04N 13/376 | (2018.01) |
| H04N 13/305 | (2018.01) |
| H04N 13/31 | (2018.01) |

(Continued)

(52) U.S. Cl.
CPC ....... *H04N 13/368* (2018.05); *G02B 27/0093* (2013.01); *G02B 27/2214* (2013.01); *H04N 13/305* (2018.05); *H04N 13/31* (2018.05); *H04N 13/351* (2018.05); *H04N 13/376* (2018.05); *H04N 13/398* (2018.05)

(58) Field of Classification Search
CPC ... H04N 13/31; H04N 13/305; G02B 27/2214
See application file for complete search history.

(56) References Cited

U.S. PATENT DOCUMENTS

| | | | |
|---|---|---|---|
| 10,432,918 B2 * | 10/2019 | Tian | G02B 27/2214 |
| 2009/0079733 A1 * | 3/2009 | Fukushima | H04N 13/398 345/419 |

(Continued)

FOREIGN PATENT DOCUMENTS

| | | |
|---|---|---|
| KR | 10-2012-0140590 A | 12/2012 |
| KR | 10-2013-0073799 A | 7/2013 |

OTHER PUBLICATIONS

Ki-Hyuk Yoon et al., "Determination of the optimum viewing distance for a multi-view auto-stereoscopic 3D display", Optics Express, vol. 22, No. 9, pp. 22616-22631, Sep. 22, 2014.

*Primary Examiner* — Fabio S Lima
(74) *Attorney, Agent, or Firm* — Rabin & Berdo, P.C.

(57) ABSTRACT

Provided is a method of forming a dynamic maximal viewing zone (DMVZ) of an autostereoscopic display apparatus. The method includes rearranging viewpoint images for each three dimensional (3D) unit pixels of a certain period k when a viewer deviates in a depth direction from a designed viewing distance (DVD), wherein the certain period k is determined according to a distance by which the viewer deviates in the depth direction from the DVD.

28 Claims, 24 Drawing Sheets
(23 of 24 Drawing Sheet(s) Filed in Color)

(51) Int. Cl.
*H04N 13/351* (2018.01)
*H04N 13/398* (2018.01)

(56) References Cited

U.S. PATENT DOCUMENTS

| | | | | |
|---|---|---|---|---|
| 2012/0249530 A1* | 10/2012 | Fukushima | ........ | G02B 27/2214 345/419 |
| 2014/0028670 A1* | 1/2014 | Tsurumi | .................. | G09G 5/14 345/419 |
| 2014/0300711 A1* | 10/2014 | Kroon | .................. | H04N 13/302 348/51 |
| 2014/0333532 A1* | 11/2014 | Ohbitsu | ............. | G02B 27/2214 345/156 |
| 2015/0029317 A1* | 1/2015 | Kim | ..................... | H04N 13/376 348/59 |
| 2015/0304644 A1* | 10/2015 | Kim | ..................... | G02B 27/225 348/54 |
| 2015/0334368 A1* | 11/2015 | Odake | ................ | H04N 13/0404 348/43 |
| 2016/0142704 A1* | 5/2016 | Hamagishi | ........... | H04N 13/376 348/59 |
| 2017/0032214 A1* | 2/2017 | Krenzer | ............. | G06K 9/00335 |
| 2017/0155893 A1* | 6/2017 | Mather | ............. | G02B 27/2214 |
| 2018/0199030 A1* | 7/2018 | Smith | ................ | G02B 27/2214 |

* cited by examiner

METHOD OF FORMING DYNAMIC MAXIMAL VIEWING ZONE OF AUTOSTEREOSCOPIC DISPLAY APPARATUS

CROSS-REFERENCE TO RELATED APPLICATION

This application claims priority to and the benefit of Korean Patent Application No. 2017-0103605, filed on Aug. 16, 2017, the disclosure of which is incorporated herein by reference in its entirety.

BACKGROUND

1. Field of the Invention

The present invention relates to an autostereoscopic display apparatus, and more particularly, to a method of providing a dynamic maximal viewing zone (DMVZ) to a viewer in spite of the viewer's depth-direction movement.

2. Discussion of Related Art

A three dimensional (3D) image implementation technology which has been proposed as a solution to the problem of 3D display glasses is generally referred to as an autostereoscopic display. Among autostereoscopic displays, a multi-view stereoscopic display is most widely known and arranges a spatially finite number of 3D viewpoint images using time-multiplexing or space-multiplexing technology to provide a 3D image having binocular disparity and motion parallax information to a viewer in front of the display.

Such an autostereoscopic multi-view display may use a parallax barrier, lenticular lenses, line light sources, and the like for parallax separation.

"Determination of the optimum viewing distance for a multi-view autostereoscopic 3D display" published in Optics Express in 2014 by the inventor of the present invention discloses a common viewing zone being formed at an optimum viewing distance according to a relational expression for a general multi-view design and a method of experimentally determining a common viewing zone. In such a multi-view design technology, only a feature of a viewing zone at an optimum viewing distance is taken into consideration.

However, since a general autostereoscopic display apparatus has an optimum viewing distance which is determined by hardware features, a viewer deviates from the optimum viewing distance when the viewer moves in a depth direction (a direction of approaching the autostereoscopic display apparatus or the opposite direction). Therefore, in the general autostereoscopic display apparatus, a depth-direction position at which it is possible to see an optimal 3D image is limited.

FIG. 1 is a conceptual diagram illustrating a feature of a viewing zone according to a position in a depth direction of a general autostereoscopic display apparatus according to a related art.

Referring to FIG. 1, an optical plate, such as a parallax barrier or lenticular lenses, is disposed on a front side of a display panel of a stereoscopic display apparatus, or line light sources are disposed on a back side, so that a 3D image is implemented. At a designed viewing distance (DVD) of the stereoscopic display apparatus, a common viewing zone is formed, and it is possible to view an optimum 3D image.

Also, at the DVD, the horizontal (same as a horizontal direction of the display panel of the stereoscopic display apparatus) degree of freedom (central VZ) of a position at which the common viewing zone is formed is sufficiently ensured. This denotes that, when a viewer is within a common viewing-zone range (central VZ) at the DVD, he or she may view a 3D image having a motion parallax generated from the overall region of the display according to his or her position.

However, when the viewer moves in the depth direction from the DVD, a horizontal range in which it is possible to view a clear 3D image generated on the whole screen of the display is reduced. For example, when the viewer moves by $\Delta Z_1$ in a display panel direction from the DVD, it is possible to view a proper 3D image only in a region R3 reduced from the common viewing zone, and it is not possible to view the proper 3D image in a region R2 or R1 because the proper 3D image and an image of a secondary viewing zone are shown to be mixed together.

FIGS. 2 to 4 are diagrams illustrating a region of a display panel in which a 3D image is properly displayed (a region filled with diagonal lines) and regions in which a secondary viewing zone image is shown when a viewer views a display which displays the 3D image at a specific position. More specifically, FIG. 2 shows that, when the viewer is at the DVD within the common viewing zone (the central VZ) or moves in a depth direction from the DVD and is within the region R3, a region of the display in which 3D image information is properly displayed becomes the whole display in the view of one (the left eye or the right eye) of the viewer's eyes. Therefore, in this case, the viewer can properly view a 3D image displayed on the whole region of the display. FIG. 3 shows a display region in which 3D image information is properly displayed (a region filled with diagonal lines) and a region in which a secondary viewing zone 3D image is shown when one of the viewer's eyes is in a right region R1 at a position that is $\Delta Z_1$ away from the DVD in a depth direction, and FIG. 4 shows a display region in which 3D image information is properly displayed (a region filled with diagonal lines) and a region in which a secondary viewing zone 3D image is shown when one of the viewer's eyes is in a right region R2 at a position that is $\Delta Z_1$ away from the DVD in a depth direction.

As shown in FIGS. 3 and 4, when the viewer is at a position that is $\Delta Z_1$ away from the DVD in a depth direction, it is possible to view a proper 3D image formed on the whole display screen only in the horizontal region R3 narrower than the common viewing zone (central VZ) at the DVD, and it is not possible to view an optimum 3D image in a region R1 or R2 outside the horizontal region because the proper 3D image and an image of a secondary viewing zone are mixed. Furthermore, when a viewing position of the viewer is additionally moved in the depth direction by $\Delta Z_2$ from the DVD, a region in which it is possible to properly view a 3D image formed on the whole region of the display panel almost disappears.

Although this example describes a case in which the viewing position is moved forward from the DVD, a horizontal range in which it is possible to view a clear 3D image generated on the whole screen of the display is limited even when the viewing position of the viewer is moved backward from the DVD, for example, by $\Delta Z_3$ from the DVD.

The above problems make it difficult to commercialize an autostereoscopic display apparatus. Consequently, it is necessary to develop a method of improving a viewer's degree of freedom to move in a depth direction by maximizing a viewing zone in which it is possible to view an optimum 3D image in spite of the viewer's depth-direction movement.

SUMMARY OF THE INVENTION

The present invention is directed to providing a method of forming a dynamic maximal viewing zone (DMVZ) of an autostereoscopic display apparatus in which it is possible to improve a viewer's degree of freedom to move in a depth direction by maximizing a viewing zone for viewing an optimum three dimensional (3D) image in spite of the viewer's depth-direction movement.

Objects of the present invention are not limited to those mentioned above, and other objects that have not been mentioned above will be clearly understood by those of ordinary skill in the art from the following description.

According to an aspect of the present invention, there is provided a method of forming a DMVZ of an autostereoscopic display apparatus, the method including: rearranging viewpoint images according to 3D unit pixels of a certain period k when a viewer deviates in a depth direction from a designed viewing distance (DVD), wherein the certain period k is determined according to a distance by which the viewer deviates in the depth direction from the DVD.

Here, the autostereoscopic display apparatus may include a display panel in which pixels are arranged and a parallax barrier or lenticular lenses disposed on a front side of the display panel, or the autostereoscopic display apparatus may include a display panel in which pixels are arranged and line light sources disposed on a back side of the display panel.

Preferably, each of the 3D unit pixels may represent pixels 1 to N forming N viewing zones at the DVD through the parallax barrier, the lenticular lenses, or the line light sources as one unit.

Preferably, when light travelling from a specific viewing position passes through one aperture of the parallax barrier or a center of one lenticular lens and then a center of one pixel of the display panel and light travelling from the same viewing position passes through another aperture of the parallax barrier or a center of another lenticular lens and then a center of another pixel of the display panel, a product of the certain period k and a period of the parallax barrier or the lenticular lenses may be a distance between the aperture of the parallax barrier or the center of the lenticular lens and the other aperture of the parallax barrier or the center of the other lenticular lens, or when light travelling from a specific viewing position passes through a center of one pixel of the display panel and then a center of a line light source and light travelling from the same viewing position passes through a center of another pixel of the display panel and then a center of another line light source, a product of the certain period k and a period of the parallax barrier or the lenticular lenses may be a distance between the center of the line light source and the center of the other line light source.

When the autostereoscopic display apparatus includes the parallax barrier or the lenticular lenses and the viewer deviates from the DVD in a direction of approaching the display panel, a pixel index may be assigned to a pixel position next but one to an original pixel position for every k 3D unit pixels to form a DMVZ. Alternatively, when the autostereoscopic display apparatus includes the line light sources and the viewer deviates from the DVD in a depth direction of receding from the display panel, a pixel index may be assigned to a pixel position next but one to an original pixel position for every k 3D unit pixels to form a DMVZ.

Here, a viewpoint image of any one of 3D unit pixels adjacent to a pixel to which no pixel index is assigned may be provided to the pixel to which no pixel index is assigned, or the number of pixels constituting every $k^{th}$ 3 D unit pixel may increase by one for a pixel to which no pixel index is assigned.

When the autostereoscopic display apparatus includes the parallax barrier or the lenticular lenses and the viewer deviates from the DVD in a depth direction of receding from the display panel, double pixel indices may be assigned to a pixel in which an original pixel position and another pixel position overlap for every k 3D unit pixels to form a DMVZ. Alternatively, when the autostereoscopic display apparatus includes the line light sources and the viewer deviates from the DVD in a direction of approaching the display panel, double pixel indices may be assigned to a pixel in which an original pixel position and another pixel position overlap for every k 3D unit pixels to form a DMVZ.

Here, a viewpoint image of any one of 3D unit pixels adjacent to the pixel to which the double pixel indices are assigned may be provided to the pixel, or the number of pixels constituting every $k^{th}$ 3D unit pixel may decrease by one for the pixel to which the double pixel indices are assigned.

The rearranging of the viewpoint images may include, when the autostereoscopic display apparatus includes the parallax barrier or the lenticular lenses: (a) backprojecting a ray passing through an aperture of the parallax barrier at a shortest distance from a horizontal center position of the DMVZ or a center of a lenticular lens at a shortest distance from the horizontal center position to a pixel of the display panel and selecting the pixel; (b) assigning a central viewpoint of a viewpoint image index corresponding to the DVD to the selected pixel; (c) configuring a 3D unit pixel by assigning as many other viewpoint image indices as designed viewpoints to left and right nearby pixels of the selected pixel to which the central viewpoint has been assigned; and (d) repeating (a) to (c) for nearby apertures of the aperture at the shortest distance from the parallax barrier or nearby lenticular lenses of the lenticular lens at the shortest distance, wherein when viewpoint information assigned to a viewpoint image index of the DVD corresponding to the pixel selected by backprojecting the ray increases or decreases, viewpoint information may be updated by determining a new central viewpoint to reflect the increased or decreased viewpoint information and assigning as many other viewpoint image indices as the designed viewpoints to left and right nearby pixels. Alternatively, the rearranging of the viewpoint images may include, when the autostereoscopic display apparatus includes the line light sources: (a) backprojecting a ray passing through a center of a line light source at a shortest distance from a horizontal center position of the DMVZ to a pixel of the display panel and selecting the pixel; (b) assigning a central viewpoint of a viewpoint image index corresponding to the DVD to the selected pixel; (c) configuring a 3D unit pixel by assigning as many other viewpoint image indices as designed viewpoints to left and right nearby pixels of the selected pixel to which the central viewpoint has been assigned; and (d) repeating (a) to (c) for nearby line light sources of the light source at the shortest distance, wherein when viewpoint information assigned to a viewpoint image index of the DVD corresponding to the pixel selected by backprojecting the ray increases or decreases, viewpoint information may be updated by determining a new central viewpoint to reflect the increased or decreased viewpoint information and assigning as many other viewpoint image indices as the designed viewpoints to left and right nearby pixels.

Preferably, the autostereoscopic display apparatus may include a system for tracking a face position or pupils of a viewer, and a maximal viewing zone may be dynamically formed on the basis of a center of the viewer's face or a center between the viewer's two eyes provided by the system.

Preferably, the autostereoscopic display apparatus may include a system for tracking face positions or pupils of a plurality of viewers, and a maximal viewing zone may be dynamically formed on the basis of an average depth-direction position of centers of the plurality of viewers' faces or centers between the viewers' two eyes provided by the system.

Preferably, the autostereoscopic display apparatus may include a system for tracking face positions or pupils a plurality of viewers, and a maximal viewing zone may be dynamically formed on the basis of an average depth-direction position and an average horizontal position of centers of the plurality of viewers' faces or centers between the viewers' two eyes provided by the system.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and advantages of the present invention will become more apparent to those of ordinary skill in the art by describing in detail exemplary embodiments thereof with reference to the accompanying drawings, in which:

FIGS. 8 and 9 are diagrams illustrating a concept of a 3D unit pixel used in a method of forming a DMVZ of an autostereoscopic display apparatus according to an exemplary embodiment of the present invention;

DETAILED DESCRIPTION OF EXEMPLARY EMBODIMENTS

Advantages, features, and methods of achieving the same will be specified with reference to the embodiments described in detail below together with the accompanying drawings. However, the present invention is not limited to the embodiments disclosed below and may be embodied in various different forms. Exemplary embodiments are provided to completely disclose the present invention and fully convey the scope of the present invention to those of ordinary skill in the technical field to which the present invention pertains. The present invention is defined only by the scope of the claims.

Hereinafter, a method of forming a dynamic maximal viewing zone (DMVZ) of an autostereoscopic display apparatus according to an exemplary embodiment of the present invention will be described with reference to the accompanying drawings.

Figure 5:
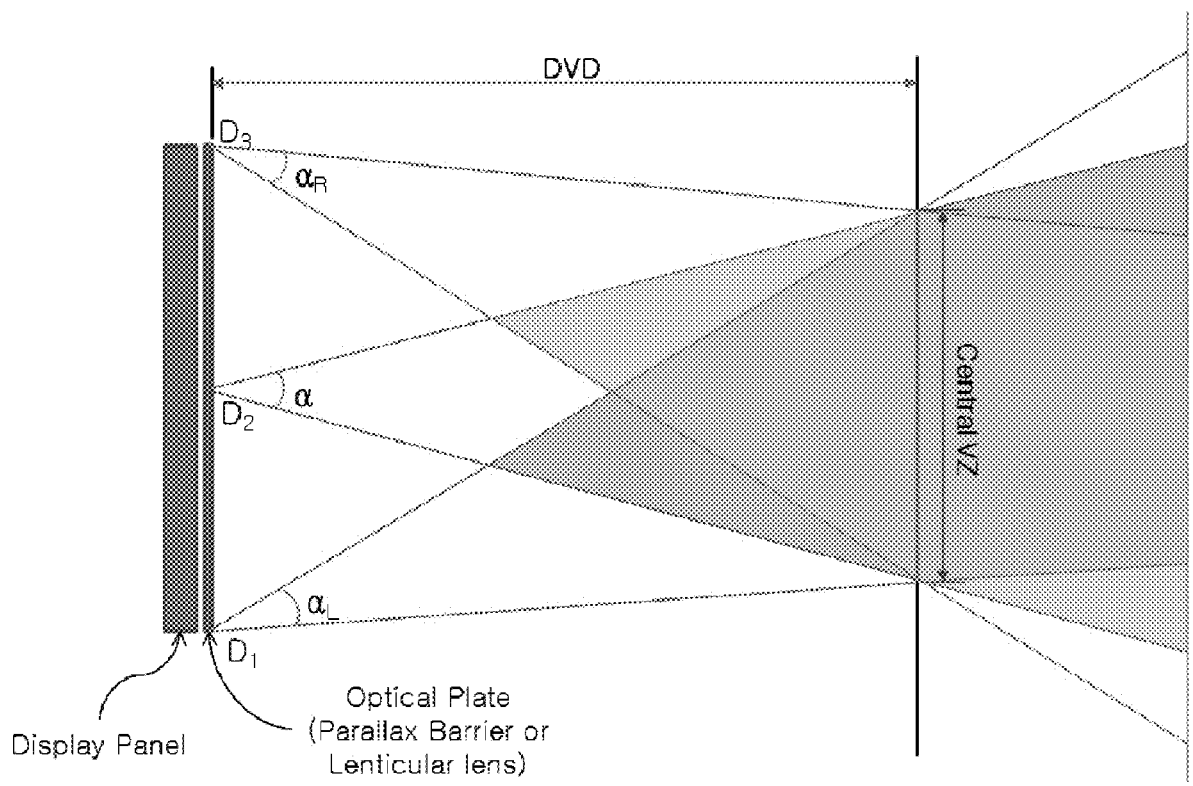
FIG. 5 is a conceptual diagram illustrating a method of forming a viewing zone of a general autostereoscopic display apparatus.

FIG. 5 is a conceptual diagram illustrating a method of forming a viewing zone of a general autostereoscopic display apparatus.

In an autostereoscopic display apparatus, a parallax barrier or lenticular lenses which are parallax separation means are disposed on a front side of a display panel, or line light sources are disposed on a back side of the display panel. In FIG. 5, pixels are horizontally and vertically disposed in the display panel, and the parallax barrier or the lenticular lenses in front of the display panel are conceptually represented regardless of their actual form. At a designed viewing distance (DVD) of this autostereoscopic display apparatus, a common viewing zone (central VZ) is formed, and it is possible to view an optimum three dimensional (3D) image. FIG. 5 shows that the common viewing zone is formed at the DVD by 3D unit pixels at outermost positions $D_1$ and $D_3$ and a center position $D_2$ of the display panel and an optical plate (a parallax barrier or lenticular lenses) disposed on the front side of the display panel. Here, $\alpha_1$, $\alpha$, and $\alpha_R$ at the outermost positions $D_1$ and $D_3$ and the center position $D_2$ of the display panel represent 3D viewing angles, and secondary viewing zones are formed outside regions formed by $\alpha_1$, $\alpha$, and $\alpha_R$.

Figure 6:
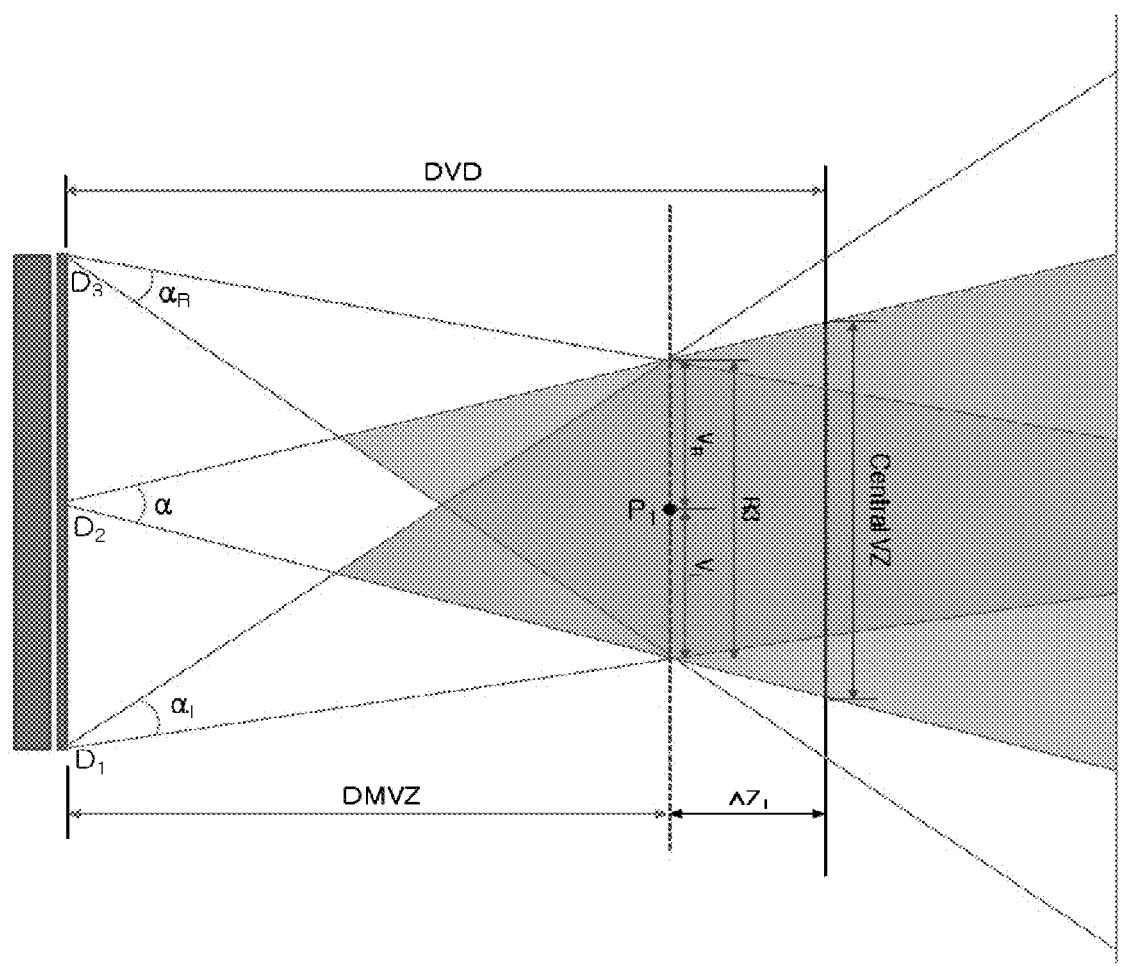
FIGS. 6 and 7 illustrate a method of forming a dynamic maximal viewing zone (DMVZ) of an autostereoscopic display apparatus according to an exemplary embodiment of the present invention, FIG. 6 being a conceptual diagram of an exemplary embodiment in which a DMVZ is formed in front of a DVD in a depth direction by an autostereoscopic display apparatus and FIG. 7 being a conceptual diagram of an exemplary embodiment in which a DMVZ is formed behind the DVD in the depth direction by an autostereoscopic display apparatus.
Figure 7:
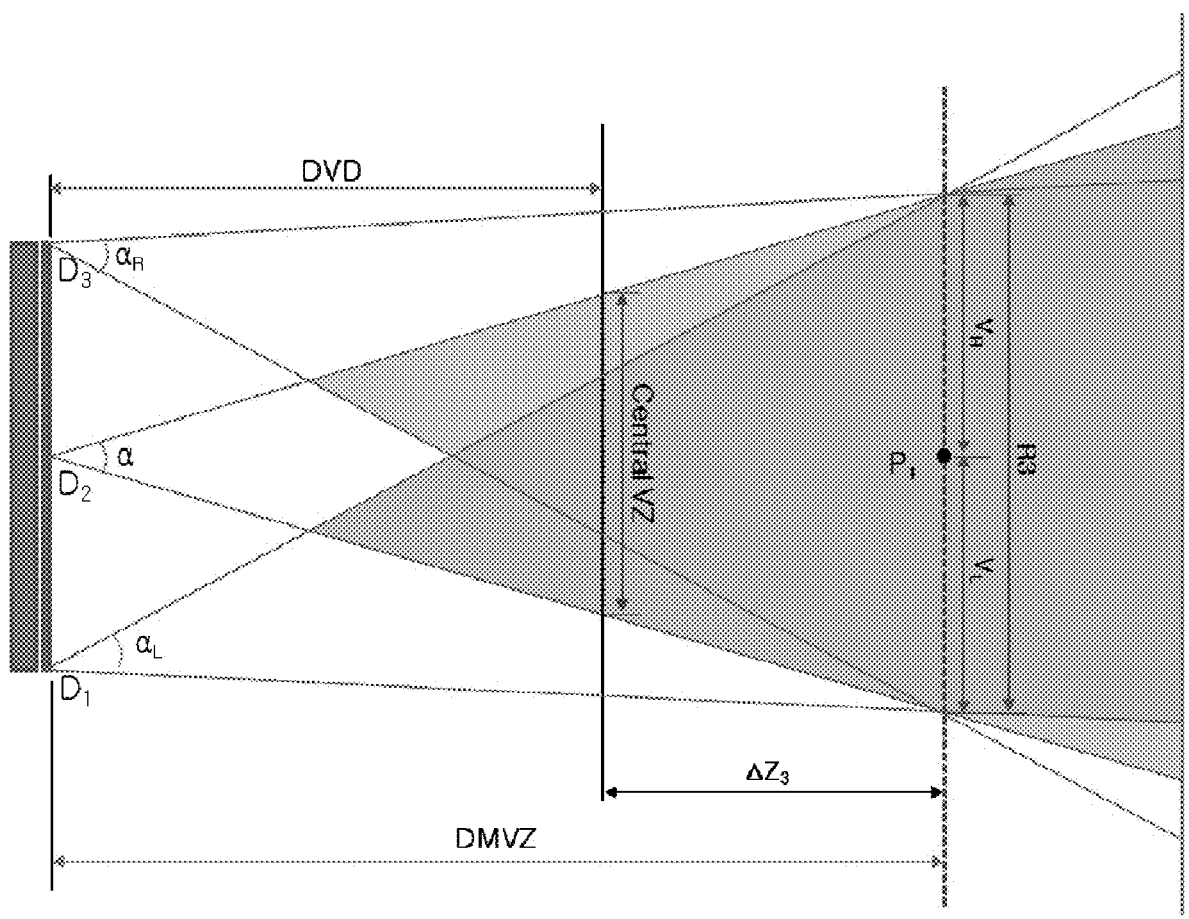

FIGS. 6 and 7 illustrate a method of forming a DMVZ of an autostereoscopic display apparatus according to an exemplary embodiment of the present invention. FIG. 6 is a conceptual diagram of an example in which a DMVZ is formed in front of a DVD in a depth direction by an autostereoscopic display apparatus, and FIG. 7 is a conceptual diagram of an example in which a DMVZ is formed behind a DVD in the depth direction by an autostereoscopic display apparatus.

As described with reference to FIG. 1, when a viewer deviates from a DVD of an autostereoscopic display apparatus in a depth direction, a horizontal range in which it is possible to view a proper 3D image is reduced (a position that is $\Delta Z_1$ away from the DVD), or a horizontal position at which it is possible to properly view a 3D image disappears (a position that is $\Delta Z_2$ away from the DVD). Therefore, a method of forming a horizontal range for providing an optimum 3D image to a viewer who deviates in a depth direction from a DVD as wide as possible will be described according to an exemplary embodiment of the present invention. In a general multi-view stereoscopic display apparatus, a determined 3D viewing angle $\alpha$ is uniform and thus is fixed. However, introducing the concept of 3D unit pixels which generate a 3D image of a stereoscopic display apparatus makes it possible to adjust a 3D image in a software manner so that the 3D image can be viewed in a horizontal region as wide as possible even not at a DVD designed in a hardware manner. A maximal viewing-zone position adjusted in this way is referred to as DMVZ.

Figure 1:
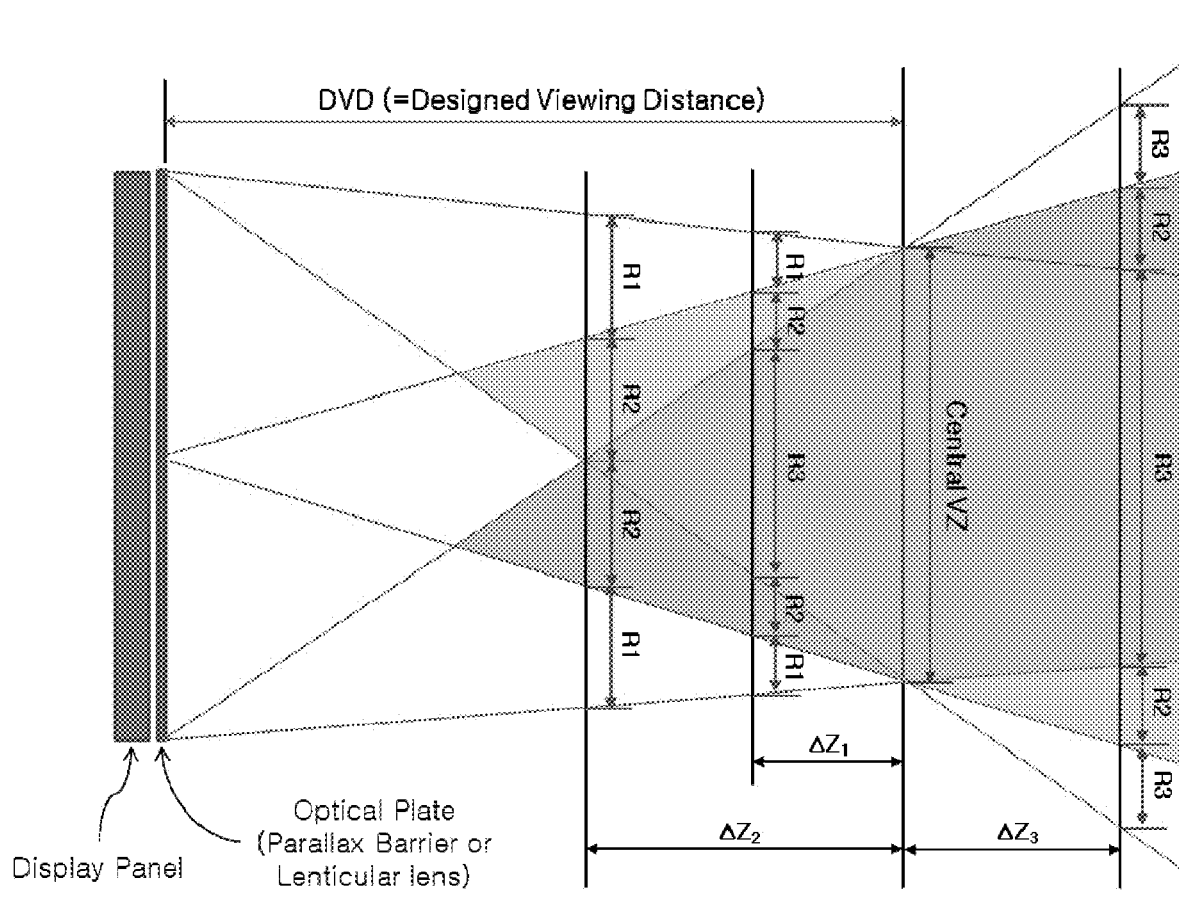
FIG. 1 is a conceptual diagram illustrating a feature of a viewing zone according to a position in a depth direction of a general autostereoscopic display apparatus according to a related art.
Figure 2:
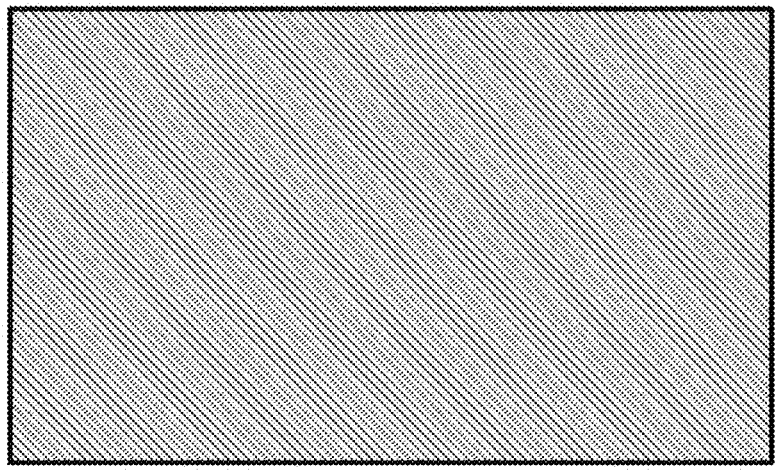
FIG. 2 shows a region of a display panel, in which a proper three dimensional (3D) image is displayed, viewed at the corresponding position when one of a viewer's two eyes is in a common viewing zone at a designed viewing distance (DVD) of FIG. 1.

FIG. 6 shows an example in which a DMVZ is formed in front of a DVD in a depth direction by an autostereoscopic display apparatus and a horizontal width R3 of the DMVZ at a position P1 is greater than the existing region R3 $\Delta Z_1$ away from the DVD of FIG. 1 in a depth direction. FIG. 7 shows an example in which a DMVZ is formed behind the DVD in the depth direction by the autostereoscopic display apparatus and a horizontal width R3 of the DMVZ at a position P1 is greater than the existing region R3 $\Delta Z_3$ away from the DVD of FIG. 1 in a depth direction.

Figure 8:
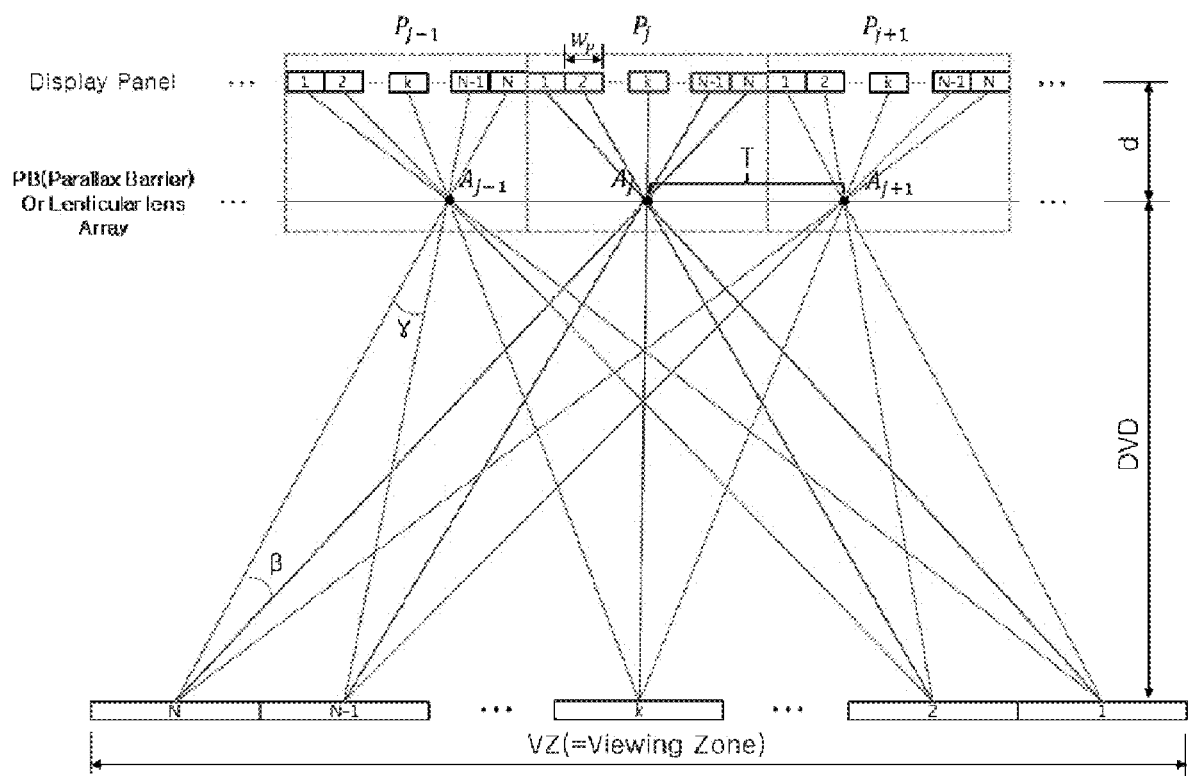
Figure 9:
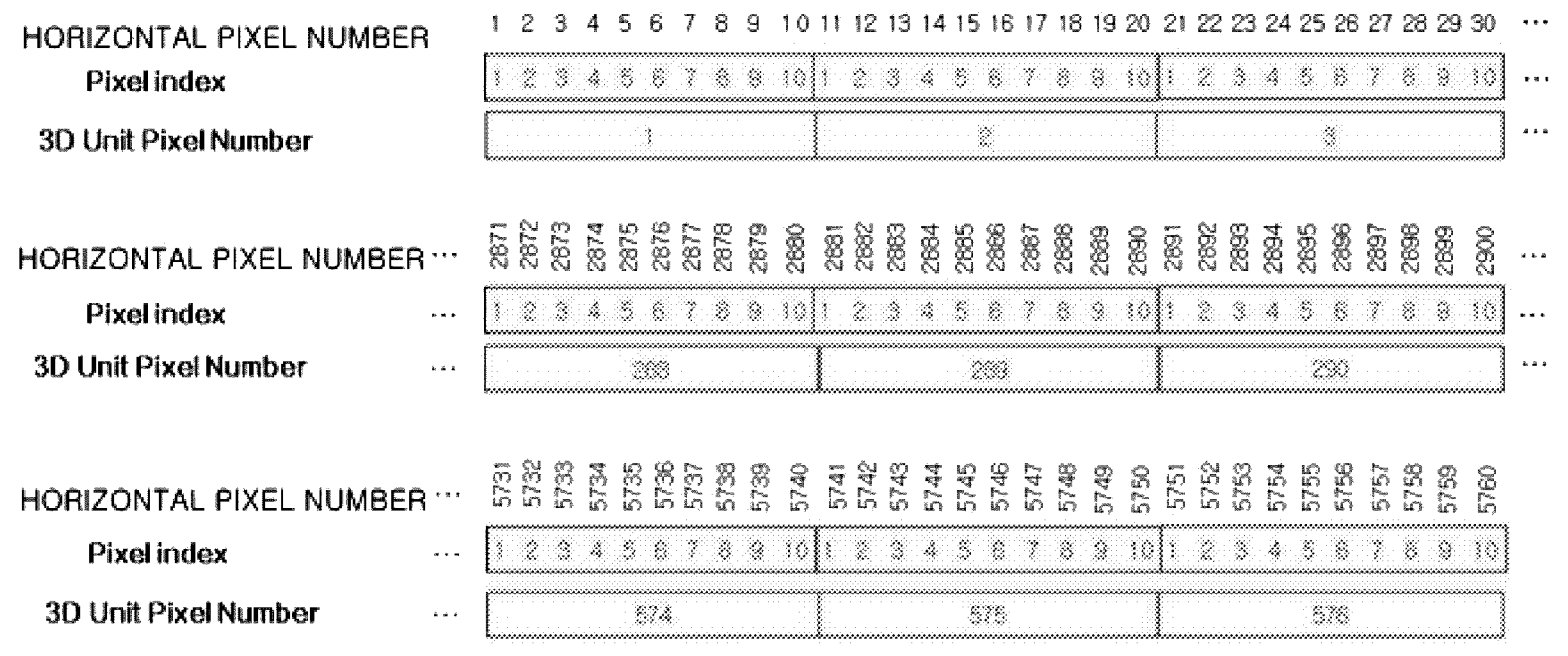

FIGS. 8 and 9 are diagrams illustrating a concept of a 3D unit pixel used in a method of forming a DMVZ of an autostereoscopic display apparatus according to an exemplary embodiment of the present invention.

Referring to FIG. 8, a 3D unit pixel is a basic unit for generating a 3D image and represents, as one unit, an aperture center $A_{j-1}$, $A_j$, or $A_{j+1}$ of a parallax barrier and pixels 1 to N on which 3D viewpoint images corresponding to the aperture center are arranged in the case of a parallax barrier type multi-view design. In other words, when a common viewing zone is formed at a DVD designed with N viewpoints in FIG. 8, one aperture center $A_j$ of the parallax barrier and pixels 1 to N on which 3D viewpoint images corresponding to the aperture center $A_j$ are arranged constitute one 3D unit pixel $P_j$. In FIG. 8, it is possible to see that 3D unit pixels $P_{j-1}$, $P_j$, and $P_{j+1}$ are horizontally disposed in a row on a display panel. These 3D unit pixels $P_{j-1}$, $P_j$, and $P_{j+1}$ form viewing zones 1 to N at the DVD.

In the case of lenticular lenses instead of the parallax barrier, a 3D unit pixel represents, as one unit, a center of a lens and pixels 1 to N on which 3D viewpoint images are arranged. Likewise, in the case of line light sources, a 3D unit pixel may represent, as one unit, a line light source and pixels 1 to N on which 3D viewpoint images are arranged.

FIG. 9 is a conceptual diagram illustrating relationships among horizontal pixel numbers, pixel indices, and 3D unit pixels. In other words, FIG. 9 shows a leftmost portion, a center portion, and a rightmost portion of a display panel designed with 10 viewpoints when a horizontal resolution is 5760 (1920*3) in units of sub-pixels.

In a display panel of a general autostereoscopic display apparatus, pixel indices for arranging viewpoint images are uniformly assigned in order of horizontal pixel number at a position of z=DVD. For example, as shown in FIG. 9, 10 pixel indices are sequentially and repeatedly assigned in order of horizontal pixel number in a one dimensional (1D) 10-viewpoint design. A group of pixel indices which are sequentially and repeatedly assigned in this manner is referred to as a 3D unit pixel, and 3D unit pixels are also sequentially disposed. The example of FIG. 9 shows that 576 3D unit pixels are disposed with 5760 horizontal pixel numbers.

Figure 10:
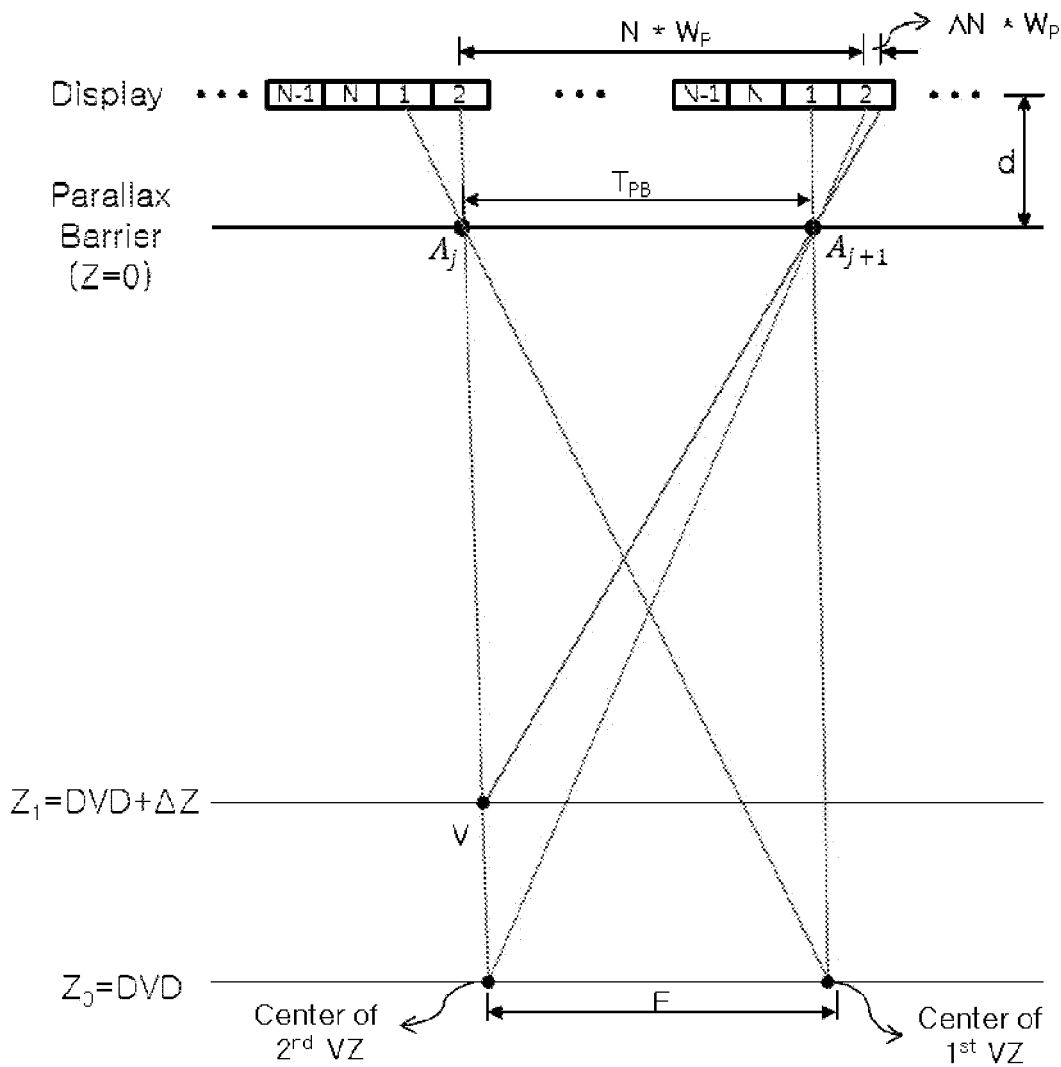
FIGS. 10 and 11 are conceptual diagrams illustrating a change in a pixel index between a DVD position and a viewing position different from the DVD position in a depth direction, FIG. 10 showing a case in which a viewer is in front of a DVD in the depth direction and FIG. 11 showing a case in which a viewer is behind the DVD in the depth direction.
Figure 11:
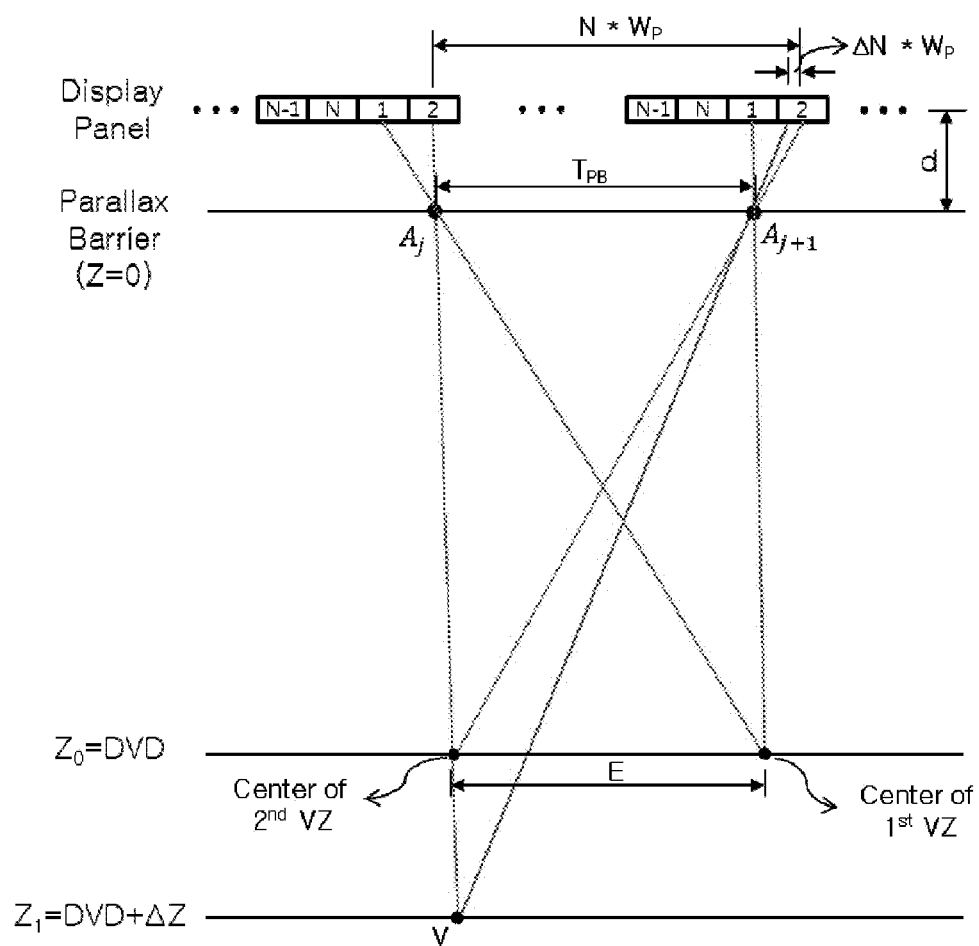

FIGS. 10 and 11 are conceptual diagrams illustrating a change in a pixel index between a DVD position and a viewing position different from the DVD position in a depth direction. FIG. 10 shows a case in which a viewer is in front of a DVD in the depth direction, and FIG. 11 shows a case in which a viewer is behind the DVD in the depth direction.

Referring to FIG. 10, pixel indices 1 to N are assigned on a display panel and thus correspond to an N-viewpoint design. Since $W_P$ is a pixel width of one pixel, $N*W_P$ is a period interval of pixel indices. When a viewing position Z is at the DVD, light travelling from a center of a first viewing zone (or a second viewing zone) through a center of the corresponding aperture in a parallax barrier or a center of the corresponding lenticular lens corresponds to a center of a pixel having a pixel index 1 (or a pixel index 2) of the display panel (see a green line and a blue line of FIG. 10).

However, when a depth-direction position of the viewer is changed from the DVD ($Z_1$=DVD+$\Delta Z$), for example, light (a blue line) travelling from a viewing position V through an aperture center $A_j$ in the parallax barrier passes through a center of a pixel having the pixel index 2, whereas light (a red line) travelling from the viewing position V through an adjacent aperture center $A_{j-1}$ in the parallax barrier passes through the corresponding parallax barrier or lenticular lens and slightly deviates outward from a center of the corresponding pixel having a pixel index 2. This deviation (width) may be represented as $\Delta N^*W_P$. For example, when light travelling from the corresponding viewing position passes through one aperture of the parallax barrier (or a center of one lenticular lens) and a center of a pixel having the same pixel index at a display pixel position, $\Delta N$ of 0.1 denotes that the light passes through an adjacent aperture of the parallax barrier (or a center of an adjacent lenticular lens) and deviates from the center of the pixel having the same pixel index at the display pixel position by 0.1 of the pixel width $W_P$. In this case, a center position of the light is moved by one pixel from the display position when passing through 10 apertures of the parallax barrier (or 10 centers of the lenticular lenses). In other words, for a viewer at a position having a depth different from a designed DVD, an interval $T_{PB}$ between centers of apertures of the parallax barrier (or lenticular lenses) does not accurately correspond to the pixel index period interval $N^*W_P$.

In particular, when Z is closer to the display panel, although light travelling from the viewing position passes through one aperture of the parallax barrier and a center of a pixel having the corresponding pixel index at the display position, light travelling from the viewing position and passing through an adjacent aperture of the parallax barrier deviates more from a center of a pixel having the corresponding pixel index at the pixel position. Therefore, in this case, it is necessary to change pixel indices assigned to pixels on the display panel.

Referring to FIG. 11, when the viewing position Z is farther than the DVD ($\Delta Z$ is a positive value), for example, light travelling from the viewing position V passes through an aperture center $A_j$ in a parallax barrier and then a center of a pixel having a pixel index 2, whereas light (a red line) travelling from the viewing position V through an adjacent aperture center $A_{j+1}$ in the parallax barrier passes through the corresponding parallax barrier or lenticular lens and slightly deviates inward from a center of the corresponding pixel having a pixel index 2. This deviation (width) may be represented as $\Delta N^*W_P$.

In other words, like in FIG. 10, an interval $T_{PB}$ between centers of apertures of the parallax barrier (or lenticular lenses) does not accurately correspond to the pixel index period interval $N^*W_P$ for a viewer at a position having a depth different from a designed DVD. In particular, when Z is farther from the DVD in a direction opposite to the display panel, although light travelling from the viewing position passes through one aperture of the parallax barrier and a center of a pixel having the corresponding pixel index at the display position, light travelling from the viewing position and passing through an adjacent aperture of the parallax barrier deviates more from a center of a pixel having the corresponding pixel index at the pixel position. Therefore, in this case also, it is necessary to change pixel indices assigned to pixels on the display panel.

In other words, as described with reference to FIGS. 10 and 11, when a depth-direction position of a viewer is not at a DVD, an error occurs between a pixel period and an optical plate period. In this manner, when a depth-direction viewing position deviates from a DVD, a difference between a period of apertures of a parallax barrier and a period of pixel indices is represented by an expression using design variables of a multi-view 3D display as follows.

In FIG. 10 (or FIG. 11), a difference between light travelling from a viewer position (a center of two eyes) rather than a DVD position and passing through centers of two apertures $A_j$ and $A_{j+1}$ of the parallax barrier and the interval $N^*W_P$ between pixels having the same pixel index at pixel positions of the display panel is represented by a proportional expression as follows.

$$(DVD+\Delta Z):T_{PB}=(DVD+\Delta Z+d):(N+\Delta N)^*W_P \qquad \text{Expression (1)}$$

Here, DVD is an optimum viewing distance, $\Delta Z$ is a deviation of the viewing position V from the DVD (a positive value indicates a viewing position farther than the DVD, and a negative value indicates a viewing position closer than the DVD), d is a distance between a pixel of the display panel and the parallax barrier and has a value converted into air gap. N is the number of viewpoints disposed in one data row, and $W_P$ is a horizontal width of a unit pixel on which a viewpoint image is individually arranged. Here, the unit pixel is a sub-pixel when red green blue (RGB) sub-pixels are horizontally disposed. $\Delta N$ is a value obtained by converting, in units of $W_P$, a deviation of an interval between light travelling from the viewing position V and passing through an aperture of the parallax barrier and light travelling from the viewing position V and passing through an adjacent aperture of the parallax barrier and arriving at a display pixel position from the pixel interval $N^*W_P$ when the viewing position V deviates from the DVD.

Expression (1) is rearranged as follows.

$$\Delta N = \frac{T_{PB}}{W_p}\left(1 + \frac{d}{DVD+\Delta Z}\right) - N \qquad \text{Expresion (2)}$$

When the optimum viewing distance DVD, the number N of viewpoints disposed in one data row, a viewpoint interval E, and a horizontal width $W_P$ of a display pixel are determined, the interval $T_{PB}$ of the parallax barrier is represented by the following expression.

$$T_{PB} = \frac{E}{E+W_p}(N*W_p) \qquad \text{Expression (3)}$$

When $T_{PB}$ of Expression (3) is substituted in Expression (2), $\Delta N$ is represented by the following expression.

$$\Delta N = \frac{-\Delta Z * W_p * N}{(E+W_p)(DVD+\Delta Z)} = -\frac{N*W_p}{E+W_p}\frac{\Delta Z}{DVD+\Delta Z} \qquad \text{Expression (4)}$$

Here, a new variable K is defined as follows.

$$abs(\Delta N)^*k \equiv 1 \qquad \text{Expression (5)}$$

k defined in Expression (5) indicates, when light travelling from the specific viewing position V passes through a center of one aperture of the parallax barrier and a center of a display panel pixel, how many apertures are skipped from the aperture so that light travelling from the specific viewing position V passes through a center of an aperture of the parallax barrier and a center of a display panel pixel. For example, when $\Delta N$ equals 0.2, k equals 5. This means that, when light travelling from the viewing position V and passing through an aperture $A_j$ of the parallax barrier arrives at a center position of one pixel on the display, light travelling from the viewing position V and passing through an aperture $A_{j+5}$ which is five apertures away from the aperture $A_j$ also arrives at a center position of one pixel on the display.

Expression (5) is rearranged with respect to k using Expression (4) as follows.

$$k = \frac{1}{\text{abs}(\Delta N)} = \frac{E + W_p}{N * W_p}\left(1 + \frac{DVD}{\Delta Z}\right) \quad \text{Expression (6)}$$

Also, a product of the interval $T_{PB}$ of apertures of the parallax barrier and k defined in Expression (5) is a horizontal size Δx in which a pixel index on the display is maintained.

$$\Delta x = k * T_{PB} \quad \text{Expression (7)}$$

$T_{PB}$ of Expression (3) and k of Expression (6) are substituted in Expression (7) and rearranged as follows.

$$\Delta x = \text{abs}\left(1 + \frac{OVD}{\Delta Z}\right) * E \quad \text{Expression (8)}$$

Therefore, as described above with reference to the expressions, when design values of an autostereoscopic display apparatus are determined, ΔN is a function of ΔZ.

These expressions correspond to a case in which an optical plate is a parallax barrier or a lenticular lens sheet but are also applicable to a case of line light sources corresponding to a non-optical plate manner by changing Expressions (3) and (4).

Figure 12:
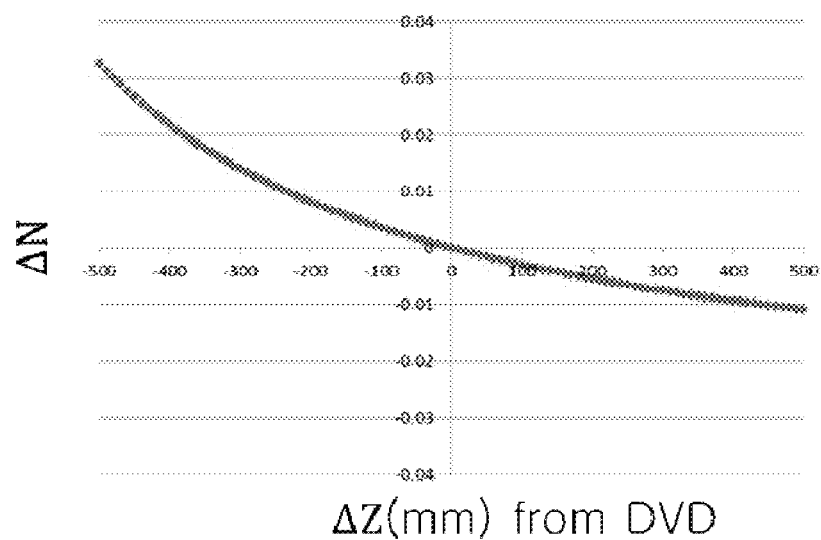
FIGS. 12 to 14 are graphs showing a relationship with $\Delta N$ or k according to a distance $\Delta Z$ from a DVD.
Figure 13:
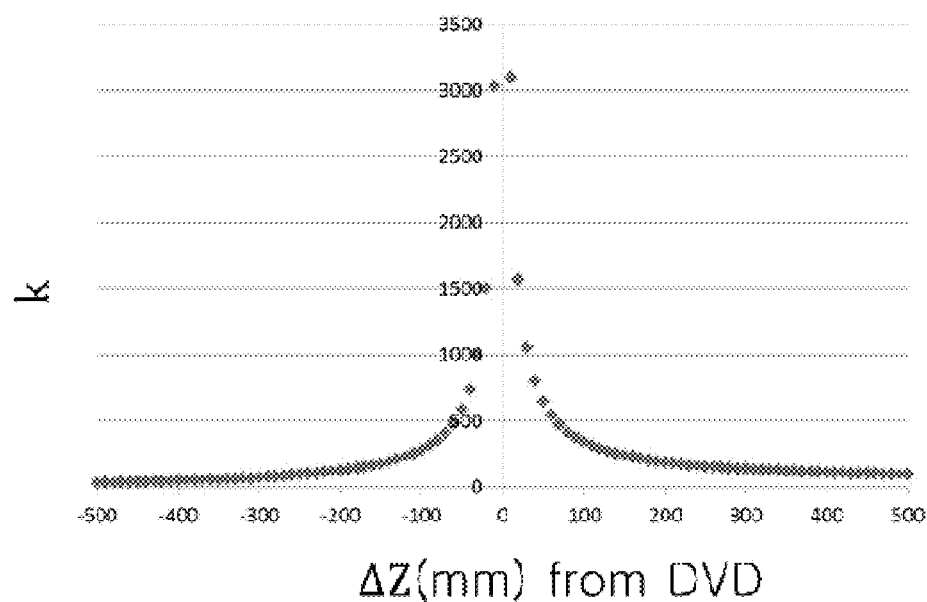
Figure 14:
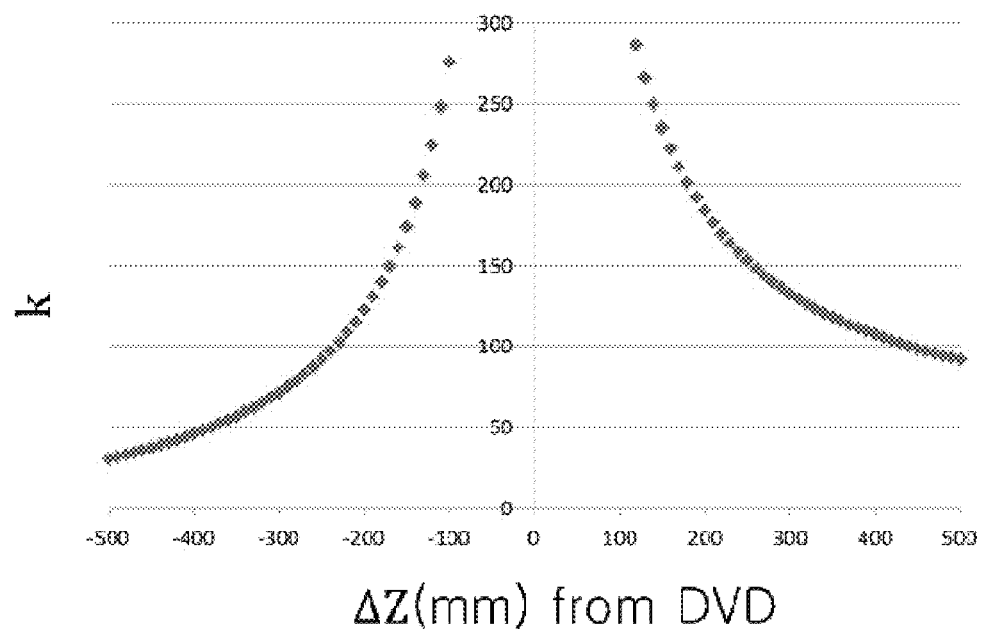

FIGS. 12 to 14 are graphs showing a relationship with ΔN or k according to a distance ΔZ from a DVD.

Referring to FIG. 12, a period of light passing through an adjacent center point of an optical plate is longer than a pixel index period at a position in front of a DVD (ΔZ is a negative value). On the contrary, a pixel index period is longer than a period of light passing through an adjacent center point of an optical plate at a position behind the DVD (ΔZ is a positive value).

When this is expressed with k, as shown in FIGS. 13 and 14, it is possible to see that k diverges at the DVD and decreases with an increase in the distance from the DVD. FIGS. 13 and 14 are graphs showing a relationship with k according to a distance ΔZ from a DVD, and FIG. 14 is a graph obtained by enlarging k which is the vertical axis of FIG. 13.

An example in which the above phenomenon is applied to a design of a 10-viewpoint stereoscopic display apparatus will be described. Table 1 shows design values of a 10-viewpoint stereoscopic display apparatus when a DVD is 1000 mm and a pixel (sub-pixel) size $W_P$ is 0.054 mm. Table 2 shows values of ΔZ, ΔN, and k calculated in the design of Table 1.

TABLE 1

| N | 10 Ea |
|---|---|
| $W_P$ | 0.054 mm |
| E | 16.5 mm |

TABLE 2

| delta Z | Delta N | k |
|---|---|---|
| −500 | 0.032621 | 30.66 |
| −450 | 0.02669 | 37.47 |
| −400 | 0.021747 | 45.98 |
| −350 | 0.017565 | 56.93 |
| −300 | 0.01398 | 71.53 |
| −250 | 0.010874 | 91.97 |
| −200 | 0.008155 | 122.62 |
| −150 | 0.005757 | 173.71 |
| −100 | 0.003625 | 275.90 |
| −50 | 0.001717 | 582.46 |
| 0 | 0 | 0 |
| 50 | −0.00155 | 643.77 |
| 100 | −0.00297 | 337.21 |
| 150 | −0.00425 | 235.03 |
| 200 | −0.00544 | 183.93 |
| 250 | −0.00652 | 153.28 |
| 300 | −0.00753 | 132.84 |
| 350 | −0.00846 | 118.24 |
| 400 | −0.00932 | 107.29 |
| 450 | −0.01012 | 98.78 |
| 500 | −0.01087 | 91.97 |

Referring to Table 2, a period lengthens at a position in front of the DVD (ΔZ is a negative value), and thus when a certain adjacent center of the optical plate is moved by k, one pixel index should be changed in a pixel arrangement. However, there is a problem that k is not an integer in the case of an arbitrary ΔZ (e.g., ΔZ=−250, k=91.97). Therefore, it is necessary to determine an approximate position corresponding to DVD+ΔZ and then determine ΔZ which makes k an integer.

Figure 15:
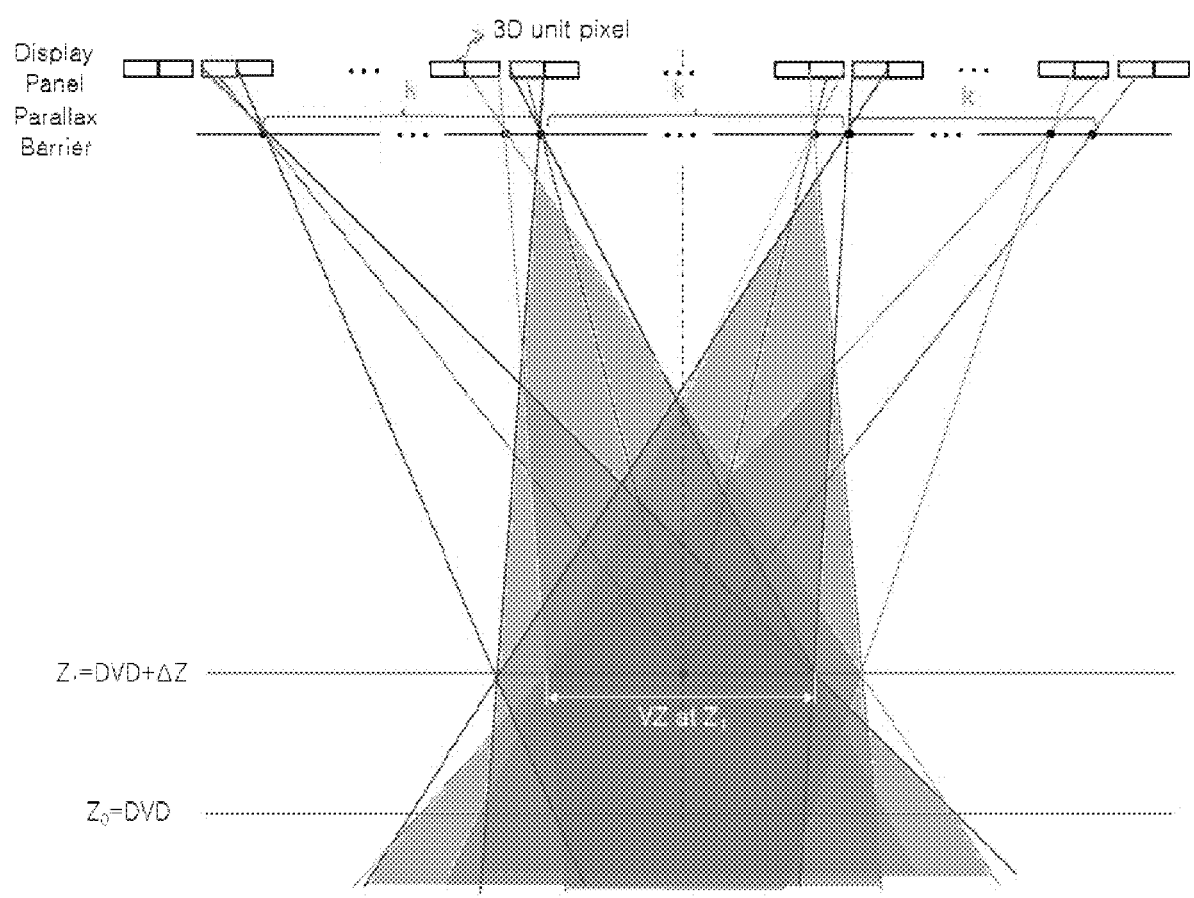
FIGS. 15 and 16 are conceptual diagrams for implementing a method of forming a DMVZ of an autostereoscopic display apparatus according to an exemplary embodiment of the present invention, FIG. 15 showing a case in which the DMVZ is formed in front of a DVD and FIG. 16 showing a case in which the DMVZ is formed behind the DVD.
Figure 16:
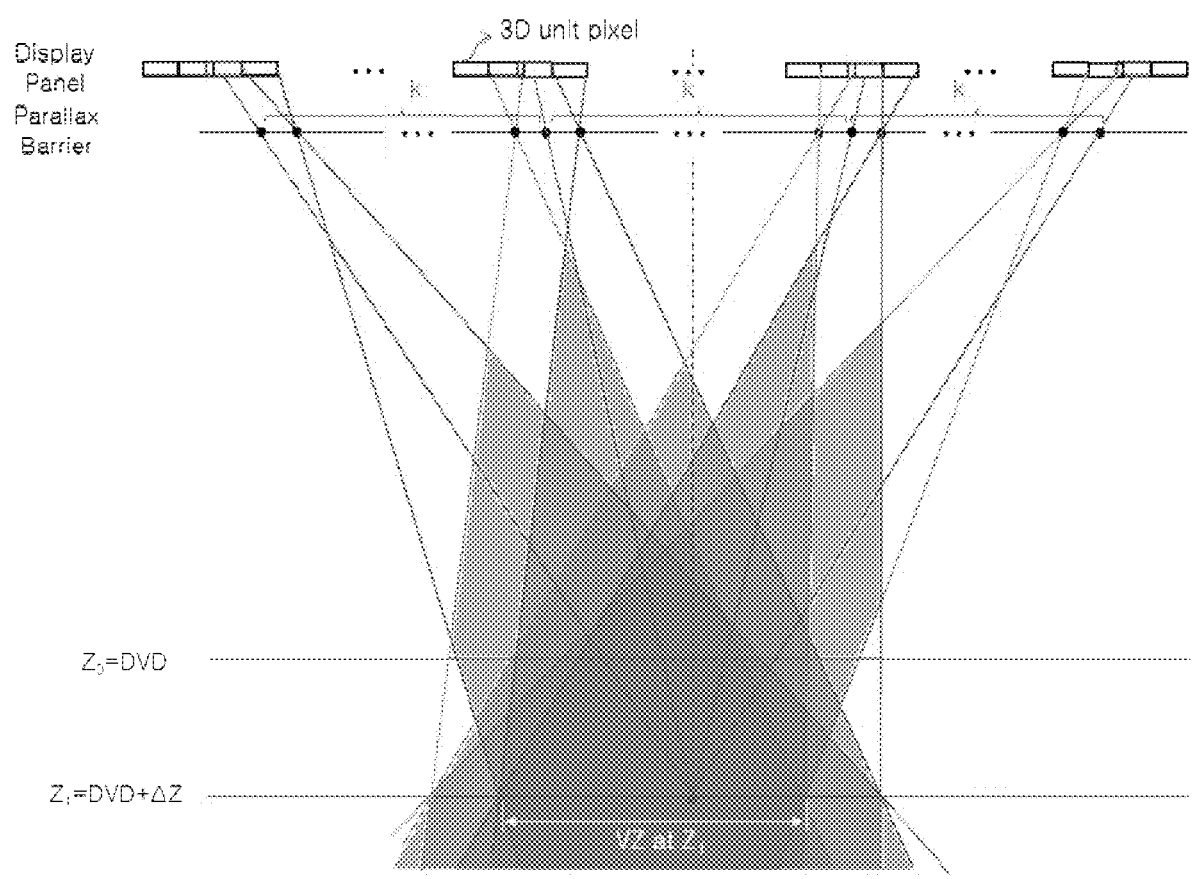

FIGS. 15 and 16 are conceptual diagrams for implementing a method of forming a DMVZ of an autostereoscopic display apparatus according to an exemplary embodiment of the present invention. FIG. 15 shows a case in which the DMVZ is formed in front of a DVD, and FIG. 16 shows a case in which the DMVZ is formed behind the DVD. Here, viewing zones formed according to 3D unit pixels shown in FIGS. 15 and 16 conceptually show results of selecting 3D unit pixels so that the DMVZ may be formed as wide as possible although a horizontal viewing-zone position does not accurately coincide with an original horizontal viewing-zone position at a depth $Z_1$ at which the DMVZ is formed.

Referring to FIG. 15, it is possible to see that a pixel index is assigned to a 3D unit pixel which is next but one to an original pixel position for every k (integer) 3D unit pixels in order to form a DMVZ at $Z_1$=DVD+ΔZ (when ΔZ is a negative value). In other words, in FIG. 15, a red 3D unit pixel is formed to be next but one to a blue 3D unit pixel for every k 3D unit pixels. The period k (integer) represents how many aperture centers (or 3D unit pixels) are skipped to form the same viewpoint of a 3D unit pixel on a pixel which is next but one to an original pixel position.

Here, an arbitrary viewpoint image may be provided to a pixel which is not included in 3D unit pixels (i.e., a pixel between a blue pixel and a red pixel to which no pixel index is assigned in FIG. 15). For example, the same viewpoint image as a left or right adjacent 3D unit pixel may be provided to the pixel. Alternatively, when an independent viewpoint image is provided, the number of pixels constituting a 3D unit pixel may be increased by one for every k 3D unit pixels, and the additional viewpoint image may be provided to the increased pixel.

Referring to FIG. 16, it is possible to see that double pixel indices are assigned to one pixel at a pixel position for every k (integer) 3D unit pixels in order to form a DMVZ at $Z_1$=DVD+ΔZ (when ΔZ is a positive value). In other words, in FIG. 16, a blue 3D unit pixel overlaps the next 3D unit pixel (red unit pixel) for every k 3D unit pixels. The period k (integer) represents how many aperture centers (or 3D unit pixels) are skipped to form a viewpoint on a pixel and the next pixel in a duplicate manner.

Here, an arbitrary viewpoint image may be provided to a pixel at which 3D unit pixels overlap (i.e., a pixel to which two pixel indices are assigned in FIG. 16). For example, the same viewpoint image as one of adjacent 3D unit pixels may be provided to the pixel. Alternatively, the number of pixels constituting a 3D unit pixel may be set to be reduced by one for every k 3D unit pixels. In other words, this is a method of changing the number of pixels included in a 3D unit pixel. Also, it is possible to group 3D unit pixels according to the period k and provide different sets of viewpoint images.

The method of forming a DMVZ of an autostereoscopic display apparatus according to an exemplary embodiment of the present invention described above with reference to FIGS. 15 and 16 may be applied not only to the case of FIGS. 15 and 16 in which a parallax barrier is disposed in front of a display panel but also to a case in which lenticular lenses are disposed. The case in which a parallax barrier is disposed in front of a display panel will be described below by way of example.

Figure 17:
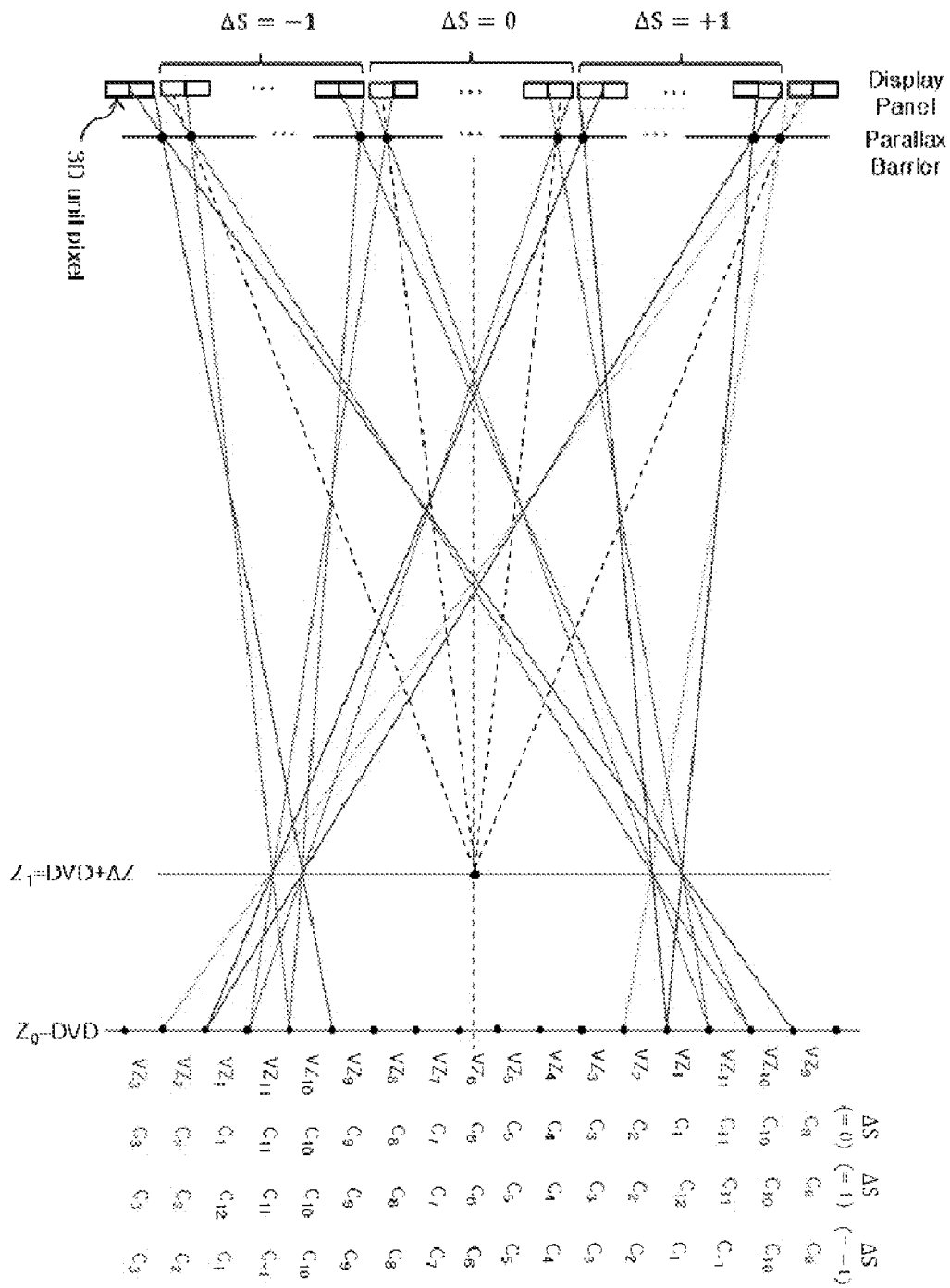
FIGS. 17 and 18 are conceptual diagrams illustrating a method of rearranging viewpoint images for each 3D unit pixels to form a DMVZ of an autostereoscopic display apparatus according to an exemplary embodiment of the present invention, FIG. 17 showing a case in which the DMVZ is formed in front of a DVD and FIG. 18 showing a case in which the DMVZ is formed behind the DVD.
Figure 18:
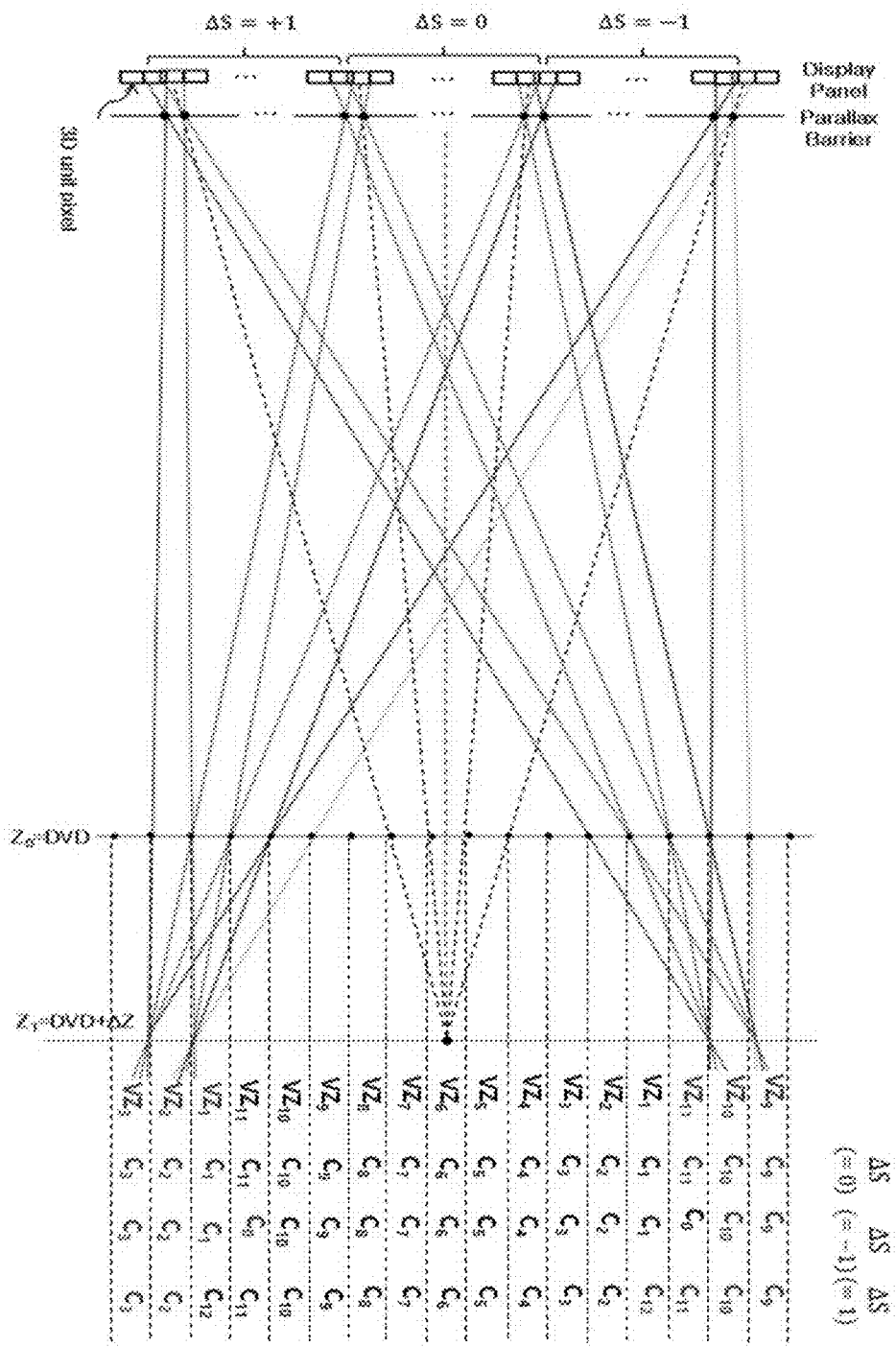

FIGS. 17 and 18 are conceptual diagrams illustrating in detail a method of arranging viewpoint images for each 3D unit pixels to form a DMVZ of an autostereoscopic display apparatus according to an exemplary embodiment of the present invention. FIG. 17 shows a case in which the DMVZ is formed in front of a DVD, and FIG. 18 shows a case in which the DMVZ is formed behind the DVD.

Figure 3:
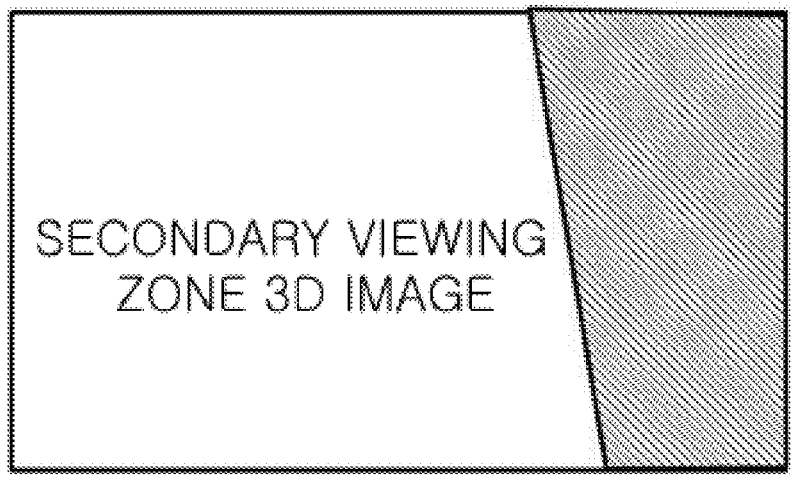
FIG. 3 shows that a display panel viewed at the corresponding position is divided into a region in which a proper 3D image is displayed and a region in which a secondary viewing zone 3D image is displayed when one of a viewer's two eyes is in a right region R1 at a depth $\Delta Z_1$ away from the DVD of FIG. 1 in a display-panel direction.
Figure 4:
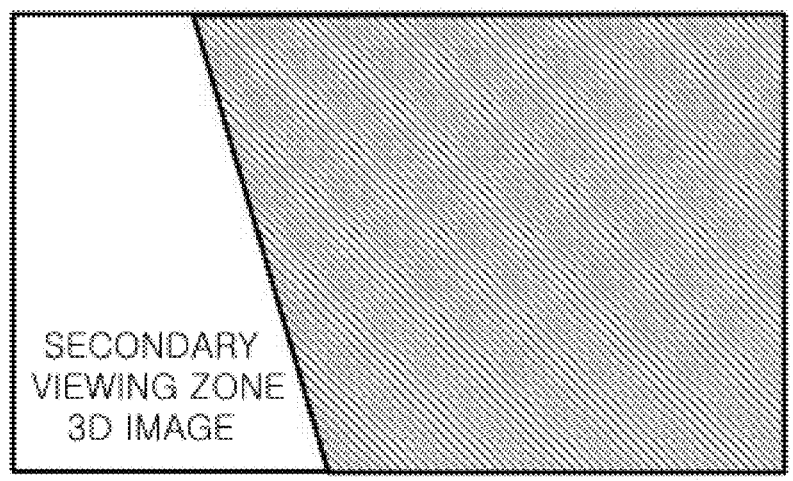
FIG. 4 shows that a display panel viewed at the corresponding position is divided into a region in which a proper 3D image is displayed and a region in which a secondary viewing zone 3D image is displayed when one of a viewer's two eyes is in a right region R2 at a position $\Delta Z_1$ away from the DVD of FIG. 1 in the display-panel direction.

As described above with reference to FIG. 15, when a DMVZ is formed to be centered on a viewing position set in front of a DVD, 3D unit pixels are consecutively disposed to be centered on the viewing position at certain periods k of apertures of a parallax barrier, and then a 3D unit pixel is disposed at the periods k. To describe this in further detail, $\Delta S$ is introduced into FIGS. 17 and 18. $\Delta S$ is a difference between pixel indices sequentially assigned to horizontal pixel numbers designed on the basis of the DVD as shown in FIG. 9 and 3D unit pixels which are groups of the pixel indices. $\Delta S$ equal to 0 represents a case in which 3D unit pixels are regularly disposed as shown in FIG. 9, and $\Delta S$ which is an integer m equal to or greater than 1 represents a 3D unit pixel set in which a pixel index (or a 3D unit pixel) corresponding to a horizontal pixel number i of FIG. 9 corresponds to a pixel having a horizontal pixel number of i+m. Likewise, $\Delta S$ which is an integer −m equal to or less than −1 represents a 3D unit pixel set in which a pixel index (or a 3D unit pixel) corresponding to the horizontal pixel number i of FIG. 9 corresponds to a pixel having a horizontal pixel number of i−m.

Also, $C_j$ (j=1, 2, . . . , and N) represents a camera image of a $j^{th}$ viewpoint at the DVD and thus is a parallax image shown at a position $VZ_j$ (j=1, 2, . . . , and N). When the DMVZ is at the DVD, regular 3D unit pixels are disposed in order of horizontal pixels as shown in FIG. 9. Therefore, $\Delta S$ equals 0 for all 3D unit pixels on the display panel, and an image $C_j$ corresponding to a pixel index j assigned to each pixel may be provided.

However, when the DMVZ deviates from the DVD as shown in FIGS. 17 and 18, viewpoint images may be arranged as described below to change the DMVZ in a software manner. FIGS. 17 and 18 illustrate a case in which the number of horizontal viewpoints is 11 (i.e., N=11) by way of example.

FIG. 17 corresponds to a case in which the DMVZ is moved in a direction toward the display from the DVD ($Z_1$=DVD+$\Delta Z$, $\Delta Z$<0). To form a maximal viewing zone at a distance $Z_1$, 3D unit pixels included in a 3D unit pixel set whose $\Delta S$ equals 0 provide a 3D parallax image $C_j$ of a camera corresponding to a viewpoint position $VZ_j$ at the DVD. 3D unit pixels included in a 3D unit pixel set whose $\Delta S$ equals +1 and which is on the right side of the 3D unit pixel set whose $\Delta S$ equals 0 are disposed with one pixel interposed between them and the 3D unit pixel set whose $\Delta S$ equals 0. A common viewing-zone position of 3D unit pixels included in the 3D unit pixel set whose $\Delta S$ equals +1 at the DVD is horizontally moved to the left of a viewer position by one viewing zone. As a result, 3D unit pixels whose $\Delta S$ equals +1 use $VZ_2$ to $VZ_{11}$ within a primary viewing-zone range as a common viewing zone, and a first secondary viewing zone $VZ_1$ on the left side of $VZ_2$ to $VZ_{11}$ is included in the common viewing zone. Identical 3D viewpoint images $C_2$ to $C_{11}$ are made to correspond to $VZ_2$ to $VZ_{11}$ which are originally within the primary viewing-zone range among $VZ_1$ to $VZ_{11}$, and to the first left secondary viewing zone $VZ_1$ newly included in the common viewing zone, a 3D camera parallax image $C_{12}$ of the corresponding position is provided. Although not included in FIG. 17, a 3D unit pixel set whose $\Delta S$ equals 2 is on the right side of k 3D unit pixels with one pixel interposed therebetween In the case of the 3D unit pixel set whose $\Delta S$ equals 2, the identical 3D viewpoint images $C_3$ to $C_{11}$ are made to correspond to $VZ_3$ to $VZ_{11}$ which are originally within the primary viewing-zone range, and to the left secondary viewing zones $VZ_1$ and $VZ_2$ newly included in the common viewing zone, 3D camera parallax images $C_{12}$ and $C_{13}$ of the corresponding positions are provided. In the same manner, when $\Delta S$ of a 3D unit pixel set is 3 or more, a new 3D camera parallax image may be provided according to a local common viewing zone corresponding to the 3D unit pixel set.

Likewise, 3D unit pixels included in a 3D unit pixel set whose $\Delta S$ equals −1 and which is on the left side of the 3D unit pixel set whose $\Delta S$ equals 0 are disposed with one pixel interposed between them and the 3D unit pixel set whose $\Delta S$ equals 0. A common viewing-zone position of 3D unit pixels included in the 3D unit pixel set whose $\Delta S$ equals −1 at the DVD is horizontally moved to the right of the viewer position by one viewing zone. As a result, 3D unit pixels whose $\Delta S$ equals −1 use $VZ_1$ to $VZ_{10}$ within the primary viewing-zone range as a common viewing zone, and a first secondary viewing zone $VZ_{11}$ on the right side of $VZ_1$ to $VZ_{10}$ is included in the common viewing zone. Identical 3D viewpoint images $C_1$ to $C_{10}$ are made to correspond to $VZ_1$ to $VZ_{10}$ which are originally within the primary viewing-zone range among $VZ_1$ to $VZ_{11}$, and to the first right secondary viewing zone $VZ_{11}$ newly included in the common viewing zone, a 3D camera parallax image $C_0$ of the corresponding position is provided. Although not included in FIG. 17, a 3D unit pixel set whose $\Delta S$ equals −2 is on the left side of k 3D unit pixels with one pixel interposed therebetween. In the case of the 3D unit pixel set whose $\Delta S$ equals −2, the identical 3D viewpoint images $C_1$ to $C_9$ are made to correspond to $VZ_1$ to $VZ_9$ which are originally within the primary viewing-zone range, and to the left secondary viewing zones $VZ_{11}$ and $VZ_{10}$ newly included in the common viewing zone, 3D camera parallax images $C_0$ and $C_{-1}$ of the corresponding positions are provided. In the same manner, when $\Delta S$ of a 3D unit pixel set is −3 or less, a new 3D camera parallax image may be provided according to a local common viewing zone corresponding to the 3D unit pixel set.

With regard to viewing zones formed in this way, $VZ_j$ and $C_j$ in black represent a common viewing zone at the DVD and a camera parallax image at a 3D unit pixel set $\Delta S$ of a primary viewing zone, and $VZ_j$ and $C_j$ in red represent a secondary viewing zone at the DVD and a camera parallax image at the 3D unit pixel set ΔS of a secondary viewing zone.

In this case, to a pixel to which no viewpoint image is assigned for every k periods between 3D unit pixel sets, an image $C_{12}$ which is provided to an adjacent pixel or an image $C_1$ may be provided.

Next, referring to FIG. 18, an arrangement of viewpoint images is moved for every k periods symmetrically with respect to a horizontal center of a DMVZ. However, a movement direction is opposite to that of FIG. 17 in which the DMVZ is formed in front of the DVD.

Specifically, a common viewing zone $VZ_1$ to $VZ_{11}$ is formed at $Z_1=DVD+\Delta Z$ by a 3D unit pixel set (ΔS=0) corresponding to the horizontal center of the DMVZ, that is, the viewpoint images $C_1$ to $C_{11}$ are provided to pixels of each 3D unit pixel included in the 3D unit pixel set (ΔS=0) to form the common viewing zone $VZ_1$ to $VZ_{11}$. After k periods, one pixel overlaps another pixel. Therefore, the next 3D unit pixel set (ΔS=−1) uses $VZ_1$ to $VZ_{10}$ within the primary viewing-zone range as a common viewing zone, and a first secondary viewing zone $VZ_{11}$ on the right side of $VZ_1$ to $VZ_{10}$ is included in the common viewing zone. Identical 3D viewpoint images $C_1$ to $C_{10}$ are made to correspond to $VZ_1$ to $VZ_{10}$ which are originally within the primary viewing-zone range among $VZ_1$ to $VZ_{11}$, and to the first right secondary viewing zone $VZ_{11}$ newly included in the common viewing zone, a 3D camera parallax image $C_0$ of the corresponding position is provided.

Similarly, before k periods, a 3D unit pixel set (ΔS=+1), $VZ_2$ to $VZ_{11}$ within the primary viewing-zone range are used as a common viewing zone, and a first secondary viewing zone $VZ_1$ on the left side of $VZ_2$ to $VZ_{11}$ is included in the common viewing zone. Identical 3D viewpoint images $C_2$ to $C_{11}$ are made to correspond to $VZ_2$ to $VZ_{11}$ which are originally within the primary viewing-zone range among $VZ_1$ to $VZ_{11}$, and to the left right secondary viewing zone $VZ_1$ newly included in the common viewing zone, a 3D camera parallax image Cu of the corresponding position is provided.

With regard to viewing zones formed in this way, $VZ_j$ and $C_j$ in black represent a common viewing zone at the DVD and a camera parallax image at a 3D unit pixel set ΔS of a primary viewing zone, and $VZ_j$ and $C_j$ in red represent a secondary viewing zone at the DVD and a camera parallax image at the 3D unit pixel set ΔS of a secondary viewing zone.

In this case, to a pixel to which 3D unit pixels are assigned in a duplicate manner for every k periods, for example, an overlapping pixel between ΔS=0 and ΔS=−1, an image $C_0$ which is originally provided to ΔS=−1 or an image $C_{11}$ which is originally provided to ΔS=0 may be provided.

Next, for a method of determining an update period k of the 3D unit pixel set ΔS and a method of updating a sub-pixel index arrangement in a method of forming a DMVZ of an autostereoscopic display apparatus according to an exemplary embodiment of the present invention, an algorithm implementation method will be described.

Figure 19:
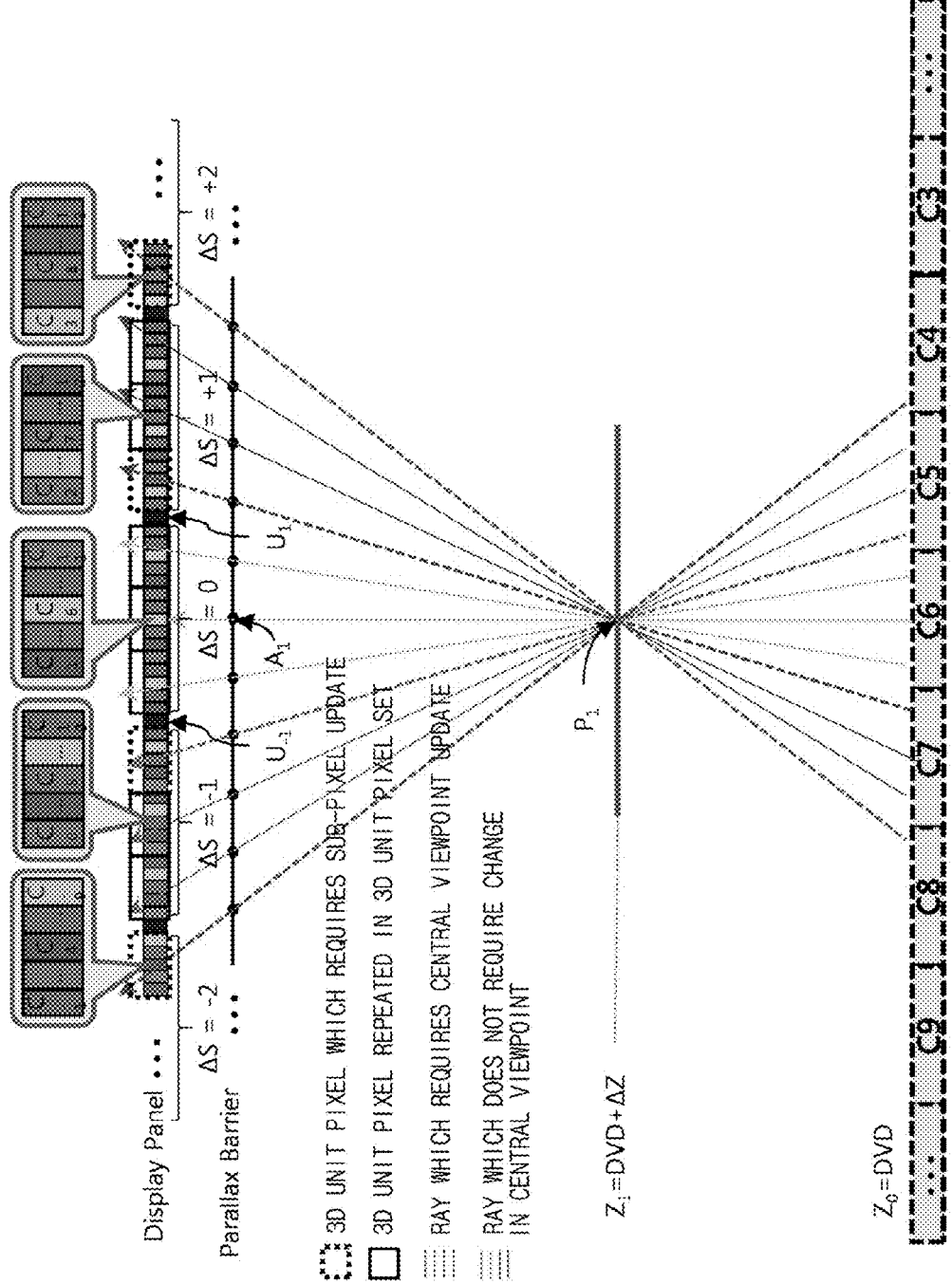
FIG. 19 is a conceptual diagram illustrating a method of determining an update period of 3D unit pixels when a DMVZ is moved in a direction toward a display from a DVD.

FIG. 19 is a conceptual diagram schematically illustrating a method of determining an update period k of a 3D unit pixel and a unit pixel set ΔS when a DMVZ is moved in a direction toward a display from a DVD ($Z_1=DVD+\Delta Z$, ΔZ<0). In FIG. 19, yellow boxes at a position of $Z_0=DVD$ represent initial indices of viewpoint images which are set to be shown according to a horizontal position of a viewer in a display design operation, $P_1$ represents a horizontal center position of a DMVZ at the distance $Z_1$, and $A_1$ represents an aperture which is closest to $P_1$. An arrangement of sub-pixels on the display panel is represented by small rectangular boxes which are distinguished by color, and sub-pixels are bound with black dotted lines (or solid lines) for distinction according to 3D unit pixels. Although FIG. 19 shows an example of a multi-view stereoscopic display apparatus in which 11 viewpoints are used, a 3D unit pixel is simply illustrated as a set of five sub-pixels for efficiency in space. Here, black dotted boxes represent 3D unit pixels which require an update of a viewpoint image index arrangement of sub-pixels, and black solid-line boxes represent 3D unit pixels which use a previously updated sub-pixel arrangement of a 3D unit pixel as is. To help understanding, a representative 3D unit pixel in each 3D unit pixel set is enlarged and shown in the uppermost portion of the drawing together with viewpoint image indices. Broken-line and solid-line arrows depict rays which travel from the position P1 and pass through centers of individual apertures. The broken-line arrows represent a case of passing through a 3D unit pixel which requires a new central-viewpoint update, and the solid-line arrows represent a case of passing through a 3D unit pixel which requires no additional central-viewpoint update.

According to an exemplary embodiment of the present invention, when the depth-direction distance $Z_1$ (=DVD+ ΔZ) and the horizontal center position P1 of the DMVZ are determined, 3D unit pixels are updated in sequence beginning with a 3D unit pixel which passes through the center $A_1$ of the parallax-barrier aperture closest to the position $P_1$ (referred to as "very center 3D unit pixel" below). Here, the 3D unit pixel update may be sequentially performed in a direction to the right and left of the central aperture $A_1$, or may be simultaneously performed in the two directions. The update means applying the above-described movement of an arrangement of viewpoint images as necessary.

Specifically, a ray passing through the center $A_1$ of the parallax-barrier aperture which is closest to the horizontal center position $P_1$ of the DMVZ is first backprojected. At this time, a viewpoint image index to be viewed at the original DVD position $Z_0$ is assigned, as a central viewpoint, to a sub-pixel matched to the display panel through the aperture. For example, in FIG. 19, an initial viewpoint image arrangement corresponds to $C_1$ to $C_{11}$ at the DVD, and $C_6$ corresponds to a central viewpoint of 3D unit pixels. Therefore, $C_6$ is assigned, as a central viewpoint, to a sub-pixel of the very center 3D unit pixel which is matched through the central aperture $A_1$ at the distance $Z_1$.

Subsequently, a 3D unit pixel (a sub-pixel set) is configured by assigning as many other viewpoint image indices as the target number of viewpoints to left and right nearby sub-pixels of the sub-pixel to which the central viewpoint has been assigned. For example, in FIG. 19, $C_1$ to $C_5$ are assigned to the left side of $C_6$, and $C_7$ to $C_{11}$ are assigned to the right side of $C_6$, so that the very center 3D unit pixel has an arrangement of the sub-pixels $C_1$ to $C_{11}$. This is the same for a 3D unit pixel at the DVD and corresponds to a case of ΔS=0, that is, viewpoint movement and assignment is unnecessary.

In the same way, rays travelling from the center position $P_1$ of the DMVZ and passing through centers of nearby apertures of the parallax barrier are backprojected. A central viewpoint image index is assigned to a sub-pixel corresponding to the shortest distance, and other nearby viewpoint information is assigned to neighboring pixels on the basis of the central viewpoint image index, so that all other 3D unit pixels are updated in sequence.

When a central viewpoint image index to be assigned to the closest sub-pixel increases or decreases compared to a central viewpoint image index of a previously updated 3D unit pixel as a result of backprojecting the ray passing through the center of the aperture of the parallax barrier, the increased or decreased viewpoint information is determined as a new central viewpoint, and viewpoint information of as many consecutive neighboring sub-pixels as the target number of viewpoints is updated on the basis of the new central viewpoint image index. This corresponds to the case described above with reference to expressions in which movement of an arrangement of viewpoint images of 3D unit pixels is performed for every k periods.

Updated 3D unit pixels have the same concept as the movement amount of an arrangement of viewpoint images described above and may be classified into 3D unit pixel sets ($\Delta S$) according to a change in a central viewpoint image index based on an initial central viewpoint at the DVD. Likewise, one empty sub-pixel (a dark blue sub-pixel indicated by $U_1$ or $U_{-1}$) to which no viewpoint image is assigned is present between 3D unit pixel sets, and arbitrary viewpoint information may be assigned to the empty sub-pixel.

Figure 20:
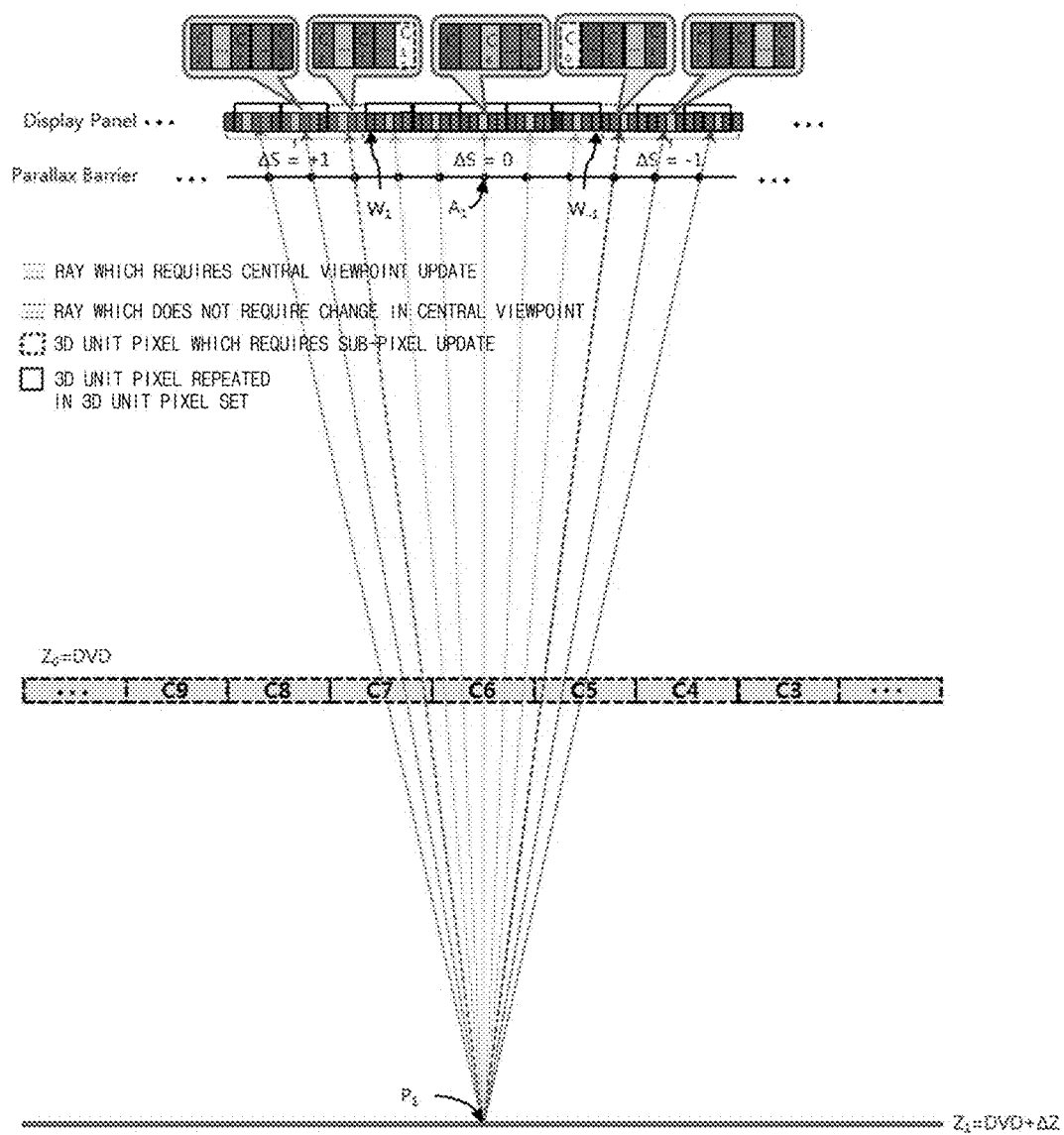
FIG. 20 is a conceptual diagram illustrating a method of determining an update period of 3D unit pixels when a DMVZ is moved in a direction opposite to a display from a DVD.

FIG. 20 is a conceptual diagram schematically illustrating a method of determining an update period k of 3D unit pixels and a unit pixel set $\Delta S$ when a DMVZ is moved in a direction opposite to a display from a DVD ($Z_1$=DVD+$\Delta Z$, $\Delta Z$>0). Like FIG. 19, in FIG. 20, yellow boxes represent initial indices of viewpoint images which are set to be shown at a position of $Z_0$=DVD according to a horizontal position of a viewer, $P_1$ represents a horizontal center position of a DMVZ at the distance $Z_1$, and $A_1$ represents an aperture which is closest to $P_1$. An arrangement of sub-pixels on the display panel is represented by small rectangular boxes which are distinguished by color, and sub-pixels are bound with black dotted lines (or solid lines) for distinction according to 3D unit pixels. Although FIG. 20 shows an example of a multi-view stereoscopic display apparatus in which 11 viewpoints are used, a 3D unit pixel is simply illustrated as a set of five sub-pixels for efficiency in space. Here, black dotted boxes represent 3D unit pixels which require an update of a viewpoint image index arrangement of sub-pixels, and black solid-line boxes represent 3D unit pixels which use a previously updated sub-pixel arrangement of a 3D unit pixel as is. To help understanding, a representative 3D unit pixel in each 3D unit pixel set is enlarged and shown in the uppermost portion of the drawing together with viewpoint image indices. Broken-line and solid-line arrows depict rays which travel from the position P1 and pass through centers of individual apertures. Among the arrows, the broken-line arrows represent a case of passing through a 3D unit pixel which requires a new central-viewpoint update, and the solid-line arrows represent a case of passing through a 3D unit pixel which requires no additional central-viewpoint update.

The basic process is the same as the above-described case of FIG. 19 in which $Z_1$<DVD. However, in a case in which $Z_1$>DVD, when viewpoint movement and assignment occurs after k periods (when a dotted line from the horizontal center position $P_1$ of the DMVZ passes through an aperture of the parallax barrier in the drawing), a sub-pixel (indicated by $W_1$ or $W_{-1}$) in which 3D unit pixels overlap is present, and it is unnecessary to change a viewpoint information index of the overlapping sub-pixel to a new viewpoint information index.

For example, as described above with reference to FIG. 18, since a viewpoint image index $C_{11}$ is assigned to an overlapping sub-pixel between $\Delta S$=0 and $\Delta S$=−1 at a period in which $\Delta S$ equals 0, it is possible to skip assigning $C_0$ to the corresponding sub-pixel when a period in which $\Delta S$ equals −1. In other words, one innermost sub-pixel is excluded from a 3D unit pixel in which a period is updated as shown in FIG. 20. In FIG. 20, a position of a sub-pixel at which 3D unit pixel sets overlap and thus a viewpoint image index update of the sub-pixel is not required is represented by a white box with a broken line, and viewpoint image indices which have been used already in 3D unit pixel updates are continuously used.

Figure 21:
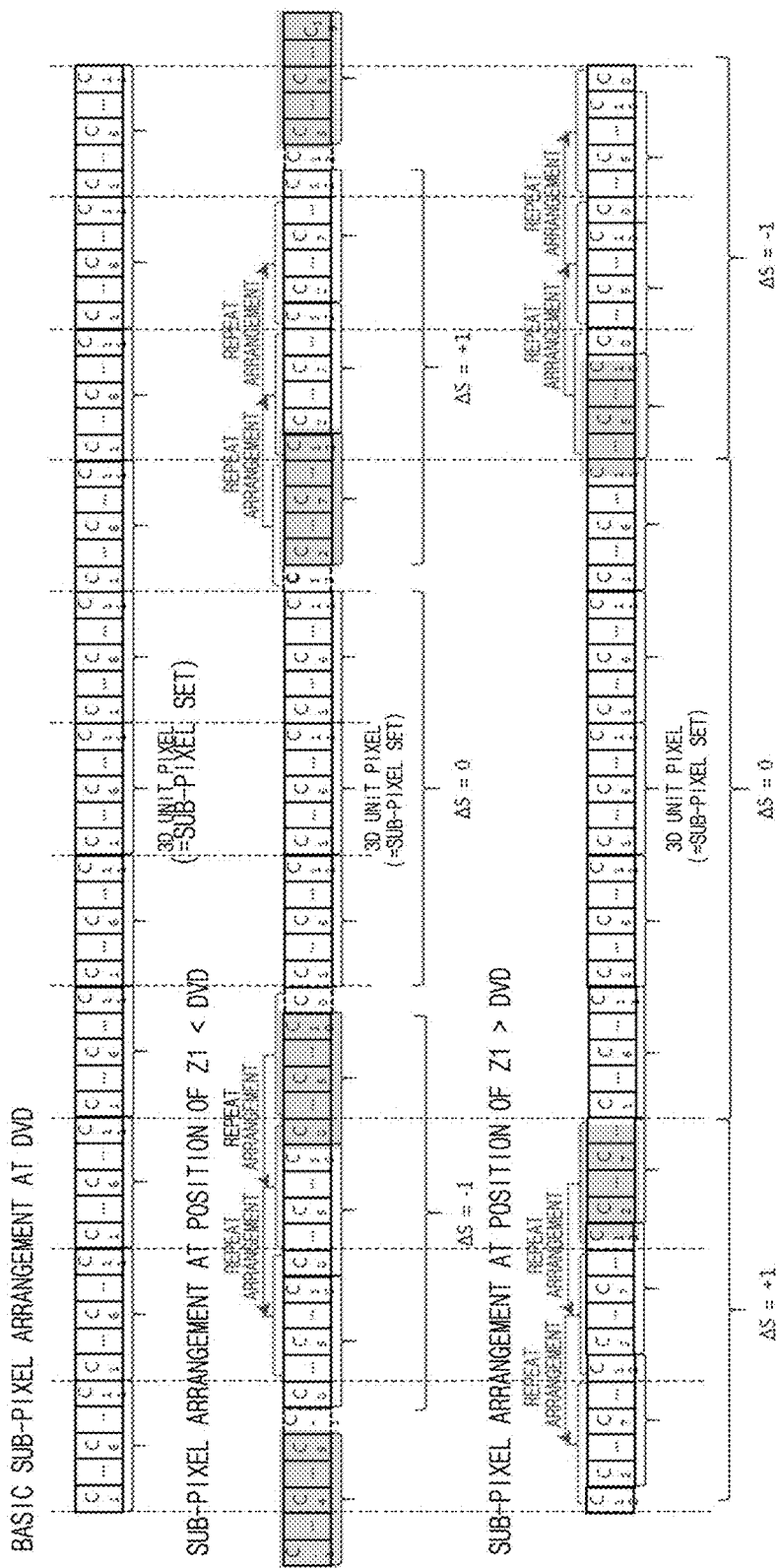
FIGS. 21 and 22 are conceptual diagrams illustrating a method of updating a sub-pixel level in a method of forming a DMVZ of an autostereoscopic display apparatus according to an exemplary embodiment of the present invention.
Figure 22:
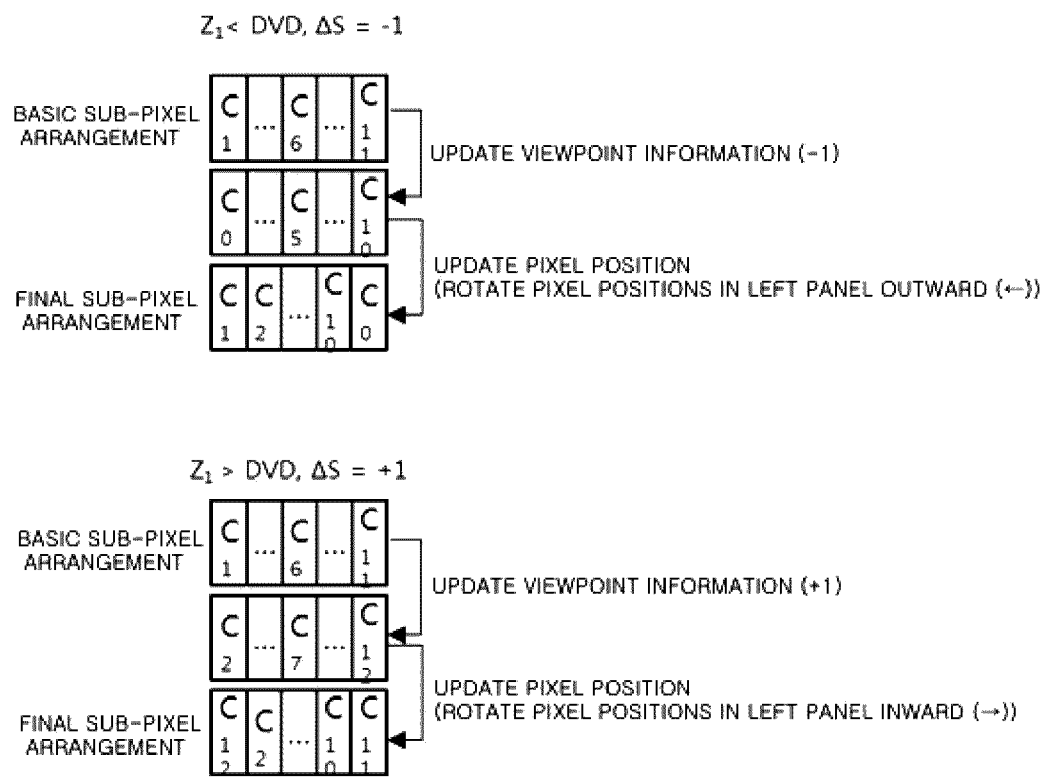

FIGS. 21 and 22 are conceptual diagrams illustrating a method of updating a sub-pixel level in a method of forming a DMVZ of an autostereoscopic display apparatus according to an exemplary embodiment of the present invention.

A system is conceptually in accordance with the above-described method of determining an update period of a 3D unit pixel set at a target viewing position and the above-described method of configuring 3D unit pixel sets. However, when sub-pixels are actually arranged in a display panel, it is possible to update an arrangement of sub-pixel indices according to the following rule.

When an update period k of 3D unit pixels and 3D unit pixel sets are completely determined according to the above methods, an actual update may be performed in a method of updating an innermost 3D unit pixel (a sub-pixel set) of a 3D unit pixel set $\Delta S$ ($\Delta S$=0) first by performing the following process and copying and reusing an arrangement of viewpoint information of 3D unit pixels, which have been updated already, for other 3D unit pixels in the set.

First, a basic sub-pixel arrangement of a 3D unit pixel used at a DVD is determined as a reference. Subsequently, the movement amount (same as a value of $\Delta S$) of a viewpoint information arrangement determined according to an actual viewing position $Z_1$ and the update period k of 3D unit pixels is added to index values assigned to a sub-pixel arrangement.

In the case of $Z_1$<DVD, when a new 3D unit pixel set is configured, an empty sub-pixel which is not actually viewed is conceptually present in front of an innermost 3D unit pixel of the set. Therefore, to reflect the empty sub-pixel, sub-pixels are moved by one sub-pixel position in a direction toward an edge (outside) of the display.

On the contrary, in the case of $Z_1$>DVD, when a new 3D unit pixel set is configured, the number of sub-pixels included in an innermost 3D unit pixel of the set is conceptually reduced by one. Therefore, to reflect the reduction, sub-pixels are moved by one sub-pixel position in a direction toward a center (inside) of the display.

The above-described method of forming a DMVZ may be applied to one or more viewers. Also, an autostereoscopic display apparatus for performing the method of forming a DMVZ according to an exemplary embodiment of the present invention may include a system for tracking a face position or pupils of a viewer. In this case, it is possible to dynamically form a maximal viewing zone on the basis of a center of the viewer's face or a center between the viewer's two eyes provided in real time by the system. When there are a plurality of viewers, it is possible to dynamically form a maximal viewing zone on the basis of an average position of centers of the plurality of viewers' faces or centers between the viewers' two eyes provided by the system.

Figure 23:
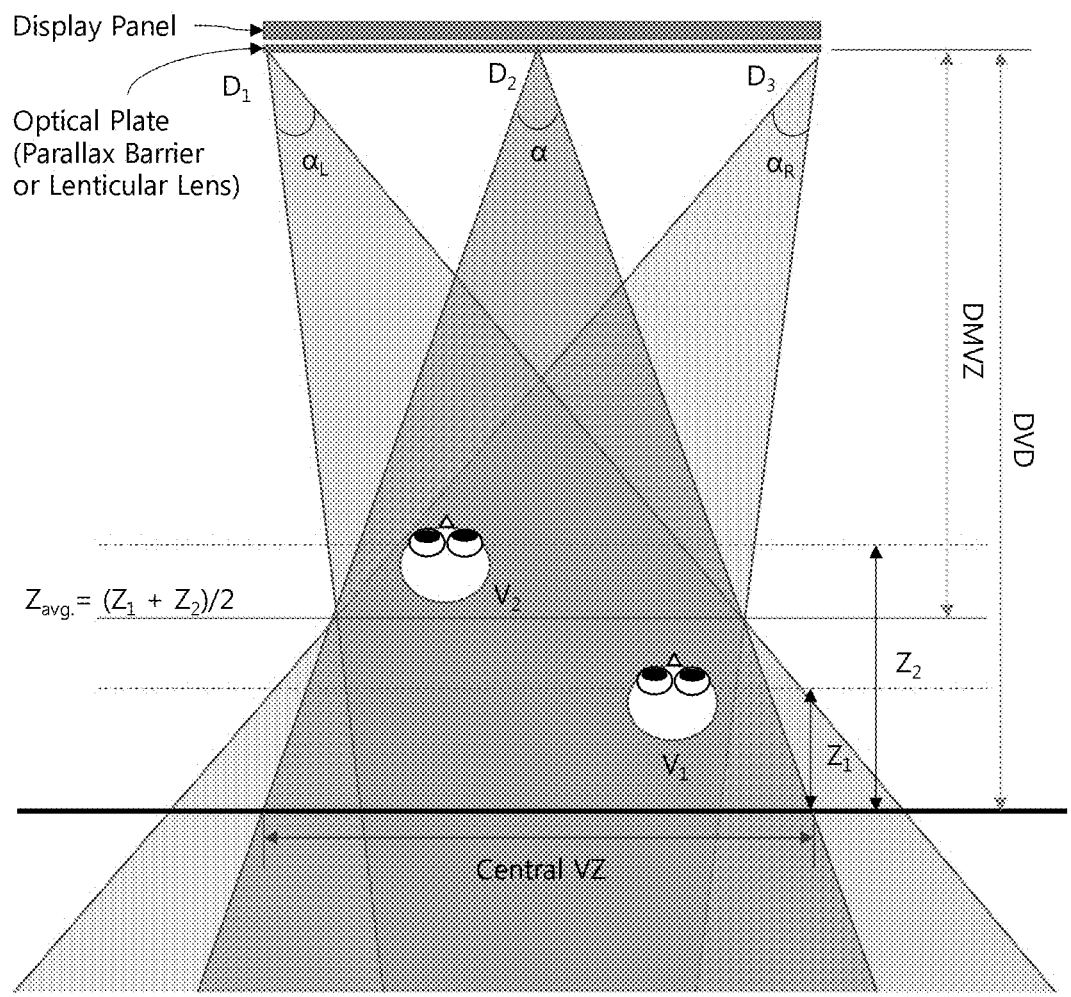
FIGS. 23 and 24 show examples in which DMVZs are formed on the basis of one dimensional (1D) and two dimensional (2D) average positions of a plurality of viewers in a method of forming a DMVZ of an autostereoscopic display apparatus according to an exemplary embodiment of the present invention.
Figure 24:
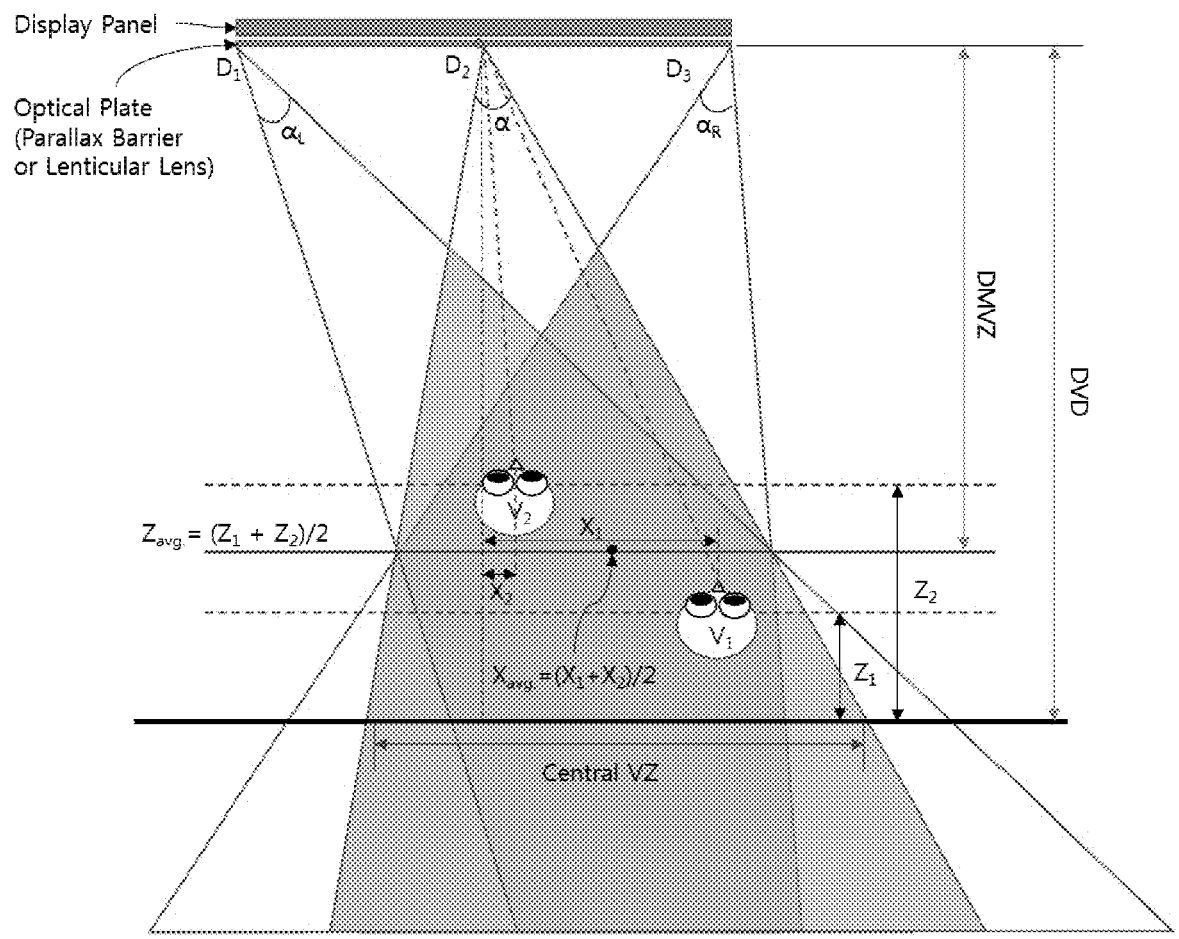

FIGS. 23 and 24 show examples in which DMVZ are formed on the basis of 1D and two dimensional (2D) average positions of a plurality of viewers in a method of forming a DMVZ of an autostereoscopic display apparatus according to an exemplary embodiment of the present invention.

FIG. 23 shows an example of a DMVZ formed at a depth-direction center position $Z_{avg}$ of two viewers $V_1$ and $V_2$ according to an exemplary embodiment of the present invention when the two viewers $V_1$ and $V_2$ are respectively at $Z_1$ ($Z_1$=DVD+$\Delta Z$, $\Delta Z$<0) and $Z_2$ ($Z_2$=DVD+$\Delta Z$, $\Delta Z$<0) on both sides of a center of the display. Here, positions of the two viewers $V_1$ and $V_2$ are provided in real time by the system for tracking a center of a face or two eyes, and the average position of the viewers may be arithmetically calculated. Other reference signs of FIG. 23 have the same meanings as those of FIG. 6

As another example of the present invention, FIG. 24 shows that a DMVZ may be formed at a position having a depth different from a DVD using average horizontal position information of a plurality of viewers as well as an average depth-direction (Z-axis direction) position of the plurality of viewers. Such an application enables as many viewers as possible to view a properly formed 3D image in a limited horizontal viewing zone of a DMVZ.

Although FIGS. 23 and 24 respectively show that it is possible to form a DMVZ for two viewers using, for example, 1D and 2D viewer position information, these methods may be applied to only one viewer, or it is possible to receive a feedback of average 3D position information of one or more viewers and determine a DMVZ position.

Thus far, a case in which an optical plate (a parallax barrier or lenticular lenses) on a front side of a display panel is applied to an autostereoscopic display apparatus has been described with reference to exemplary embodiments. From now, an example in which a method of forming a DMVZ according to an exemplary embodiment of the present invention is applied to an autostereoscopic display apparatus in which line light sources having a certain period $T_LS$ are disposed on a back side of a display panel will be described.

Figure 25:
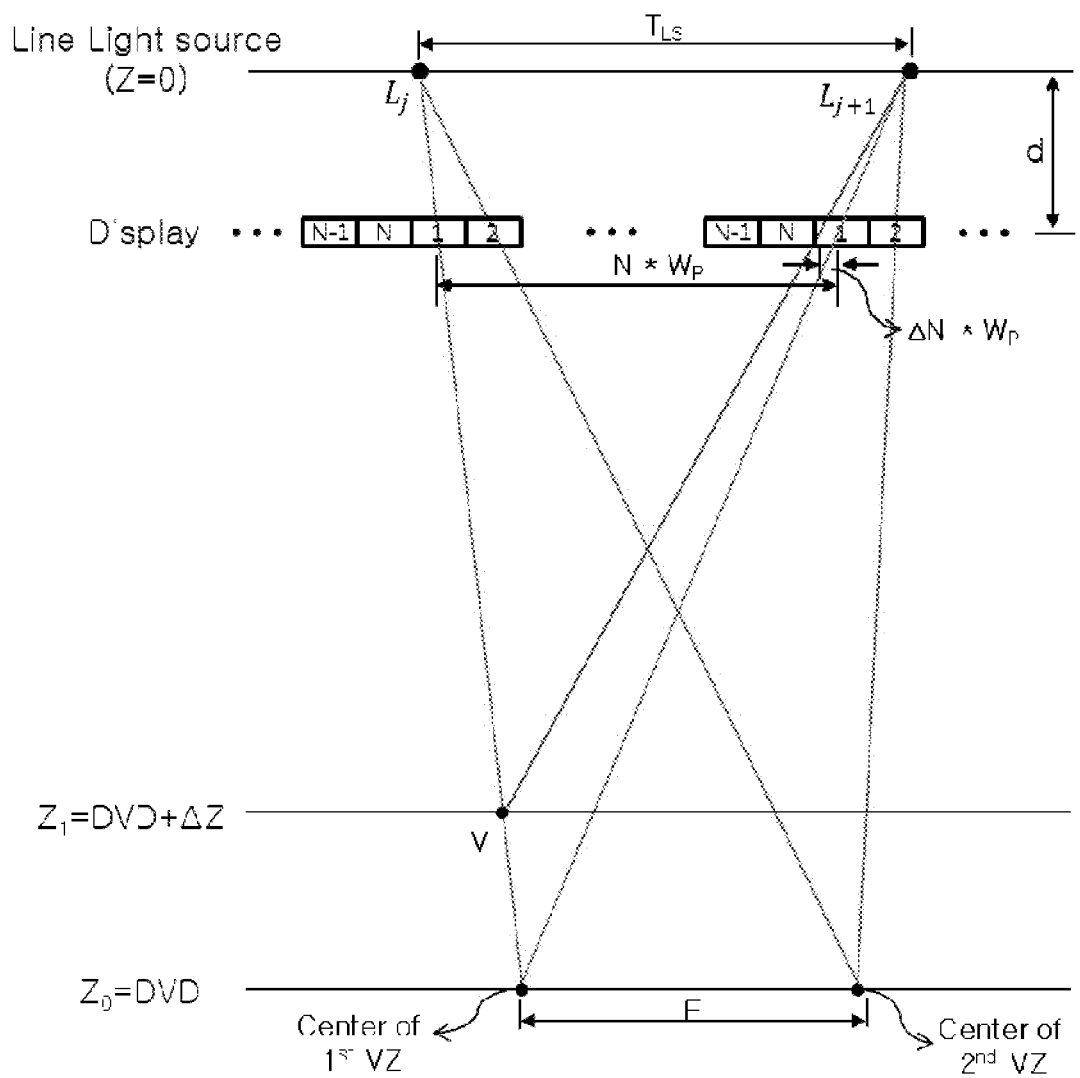
FIGS. 25 and 26 are conceptual diagrams illustrating a method of forming a DMVZ according to an exemplary embodiment of the present invention in an autostereoscopic display apparatus employing line light sources, FIG. 25 showing a case in which a viewer is in front of a DVD in a depth direction and FIG. 26 showing a case in which a viewer is behind the DVD in the depth direction.
Figure 26:
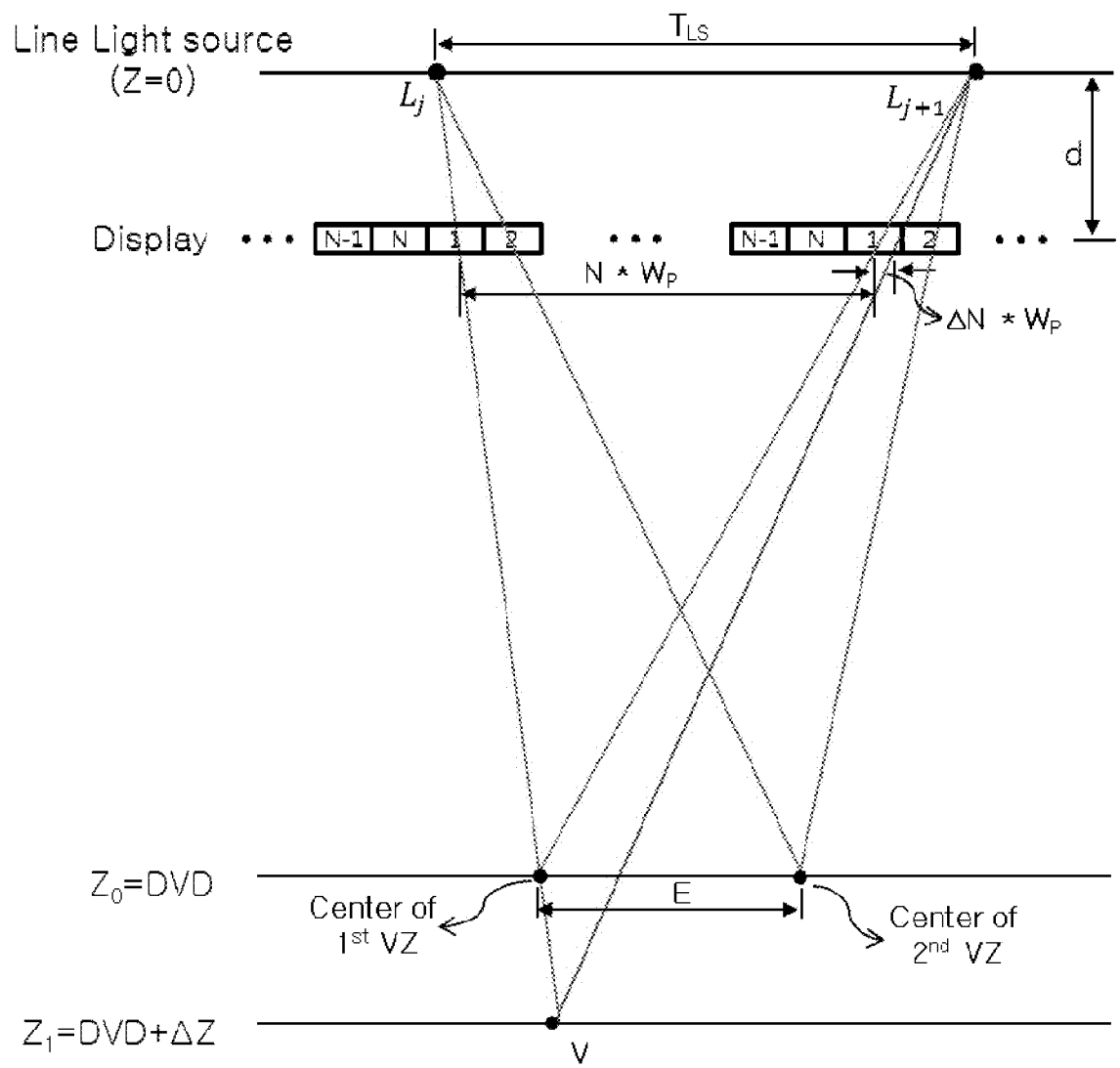

FIGS. 25 and 26 are conceptual diagrams illustrating a method of forming a DMVZ according to an exemplary embodiment of the present invention in an autostereoscopic display apparatus employing line light sources. FIG. 25 shows a case in which a viewer is in front of a DVD in a depth direction, and FIG. 26 shows a case in which a viewer is behind the DVD in the depth direction.

Referring to FIG. 25, when a viewing distance $Z_1$ is shorter than a DVD ($\Delta Z$ is a negative value), for example, light (a blue line) travelling from a viewing position V passes a center of a pixel having a pixel index 1 and a center $L_j$ of a line light source. However, light (a red line) travelling from the viewing position V and passing through a center $L_{j+1}$ of an adjacent line light source slightly deviates inward from the center of the pixel having the pixel index 1. This deviation (width) may be represented as $\Delta N*W_P$. FIG. 25 shows the same tendency as a case in which an optical plate (a parallax barrier or lenticular lenses) is disposed on a front side of a display panel and the viewer moves at the DVD in a direction of receding from the display (see FIG. 11).

Referring to FIG. 26, when the viewing distance $Z_1$ is farther than the DVD ($\Delta Z$ is a positive value), for example, light (a blue line) travelling from a viewing position V passes a center of a pixel having a pixel index 1 and a center $L_j$ of a line light source. However, light (a red line) travelling from the viewing position V and passing through a center $L_{j+1}$ of an adjacent line light source slightly deviates outward from the center of the pixel having the pixel index 1. This deviation (width) may be represented as $\Delta N*W_P$. FIG. 26 shows the same tendency as a case in which an optical plate (a parallax barrier or lenticular lenses) is disposed on a front side of a display panel and the viewer moves at the DVD in a direction of approaching the display (see FIG. 10).).

Like this, the same principle may be applied to a case in which a method of forming a DMVZ according to an exemplary embodiment of the present invention is used in an autostereoscopic display apparatus employing line light sources and a case in which a method of forming a DMVZ according to an exemplary embodiment of the present invention is used in an autostereoscopic display apparatus employing a parallax barrier or lenticular lenses, excepting that the two cases have contrary features according to a depth-direction position at which the DMVZ is formed from a DVD.

According to the present embodiment, provision of a viewpoint image is controlled according to individual 3D unit pixels to maximize a viewing zone in which it is possible to view an optimum 3D image in spite of a viewer's depth-direction movement, so that the viewer's degree of freedom to move in a depth direction can be improved.

Since a stereoscopic display apparatus to which an exemplary embodiment of the present embodiment is applied can provide a maximum viewing zone width in a software manner even at a depth different from a DVD designed in a hardware manner like at an original DVD, it is possible to change a DVD according to a use of any autostereoscopic display apparatus (hardware). Therefore, utilization of an autostereoscopic display apparatus can be improved. In other words, as a method for overcoming difficulties in commercializing such an autostereoscopic display apparatus, an exemplary embodiment of the present invention makes it possible to manufacture a general-use autostereoscopic display apparatus (hardware) and use the autostereoscopic display apparatus in a software manner according to an environment in which a viewer uses the autostereoscopic display apparatus.

Although exemplary embodiments of the present invention have been described in detail above with reference to the accompanying drawings, the present invention is not limited to these embodiments and may be practiced in a variety of modified ways without departing from the technical spirit of the present invention. Therefore, the embodiments disclosed in the present invention are intended not to limit but to describe the technical scope of the present invention, and the scope of the technical spirit of the present invention is not limited by the embodiments. The embodiments set forth herein should be construed as exemplary and not limiting. The scope of the present invention is disclosed in the following claims, and all technical spirits within the range of their equivalents shall be construed as being included in the scope of the present invention.

What is claimed is:

1. A method for providing a dynamic maximal viewing zone (DMVZ) of an autostereoscopic display apparatus, the method comprising:
   in response to position of a viewer which being deviated in a depth direction from a designed viewing distance (DVD), rearranging viewpoint images for each three dimensional (3D) unit pixels of a period cycle k' (integer), wherein
   the period cycle k' (integer) is an integer closest to a value k that is defined by the following equation:

$$k = \frac{E + W_p}{N * W_p}\left(1 + \frac{DVD}{\Delta Z}\right),$$

wherein $\Delta Z$ is a deviation of the viewing position from the DVD, N is the number of viewpoints disposed in one data row, E is a viewpoint interval, and $W_P$ is a horizontal width of a display pixel,
wherein each of the 3D unit pixels represents pixels 1 to N formed viewing zones at the DVD as one unit and each pixel provides different viewpoint images with each other,
the period cycle k' (integer) is determined in response to determination of the distance of a deviation by which the viewer deviates in the depth direction from the DVD.

2. The method of claim 1, wherein the autostereoscopic display apparatus includes at least one of a display panel in which pixels are arranged and a parallax barrier or lenticular lenses disposed on a front side of the display panel.

3. The method of claim 1, wherein the autostereoscopic display apparatus includes a display panel in which pixels are arranged and line light sources disposed on a back side of the display panel.

4. The method of claim 2, wherein a product value of the period cycle k' and an interval of the parallax barrier or the lenticular lenses is determined based on a distance between the first aperture of the parallax barrier or a center of the first lenticular lens and the second aperture of the parallax barrier or a center of the second lenticular lens, wherein
the value is determined by light travelling from a specific viewing position passes through the first aperture of the parallax barrier or the center of the first lenticular lens and then the center of the first pixel of the display panel and light travelling from the same viewing position passes through the second aperture of the parallax barrier or the center of the second lenticular lens and then travelling the center of the second pixel of the display panel.

5. The method of claim 3, wherein a product value of the period cycle k' and an interval of a line light source is determined based on a distance between a center of the first line light source and a center of the second line light source, wherein
the value is determined by detection of light travelling from a specific viewing position passes through a center of the first pixel of the display panel and then the center of the line light source and light travelling from the same viewing position passes through the center of the second pixel of the display panel and then travelling the center of the second line light source.

6. The method of claim 2, in response to position of the viewer being deviated from the DVD in a direction of approaching the display panel, assigning a pixel index to a pixel position next to an original pixel position for every k 3D unit pixels to form a dynamic maximal viewing zone (DMVZ).

7. The method of claim 3, in response to position of the viewer being deviated from the DVD in a depth direction of receding from the display panel, assigning a pixel index to a pixel position next to an original pixel position for every k 3D unit pixels to form a DMVZ.

8. The method of claim 6, wherein in response to detection of no pixel index is assigned, providing a viewpoint image of any one of 3D unit pixels adjacent to a pixel to the pixel.

9. The method of claim 6, in response to detection of no pixel index is assigned, providing a number of pixels constituting every $k^{th}$ 3D unit pixel by increasing one pixel per a pixel, and providing an additional viewpoint image to the increased pixel.

10. The method of claim 2, wherein in response to position of the viewer being deviated from the DVD in a depth direction of receding from the display panel, assigning double pixel indices to a pixel in which an original pixel position and another pixel position overlap for every k 3D unit pixels to form a DMVZ.

11. The method of claim 3, wherein in response to position of the viewer being deviated from the DVD in a direction of approaching the display panel, assigning double pixel indices to a pixel in which an original pixel position and another pixel position overlap for every k 3D unit pixels to form a DMVZ.

12. The method of claim 10, wherein in response to detection of the double pixel indices being assigned, assigning a viewpoint image of any one of 3D unit pixels adjacent to the pixel to the pixel.

13. The method of claim 10, wherein in response to detection of the double pixel indices being assigned, decreasing a number of pixels constituting every $k^{th}$ 3D unit pixel by one for the pixel.

14. The method of claim 6, wherein the rearranging of the viewpoint images comprises:
(a) selecting the pixel by backprojecting a ray passing through an aperture of the parallax barrier at a shortest distance from a horizontal center position of the DMVZ or a center of a lenticular lens at a shortest distance from the horizontal center position to a pixel of the display panel;
(b) assigning a central viewpoint of a viewpoint image index corresponding to the DVD to the selected pixel;
(c) configuring a 3D unit pixel by assigning as many other viewpoint image indices as designed viewpoints to left and right nearby pixels of the selected pixel to which the central viewpoint has been assigned; and
(d) processing by repeating (a) to (c) steps for nearby apertures of the aperture at the shortest distance from the parallax barrier or nearby lenticular lenses of the lenticular lens at the shortest distance, wherein
in response to detection of ray increase or decrease of viewpoint information assigned to a viewpoint image index of the DVD corresponding to the pixel selected by backprojecting, updating viewpoint information by determining a new central viewpoint to reflect the increased or decreased viewpoint information and
assigning as many other viewpoint image indices as the designed viewpoints to left and right nearby pixels.

15. The method of claim 7, wherein the rearranging of the viewpoint images comprises:
(a) selecting the pixel by backprojecting a ray passing through a center of a line light source at a shortest distance from a horizontal center position of the DMVZ to a pixel of the display panel;
(b) assigning a central viewpoint of a viewpoint image index corresponding to the DVD to the selected pixel;
(c) configuring a 3D unit pixel by assigning as many other viewpoint image indices as designed viewpoints to left and right nearby pixels of the selected pixel to which the central viewpoint has been assigned; and
(d) processing by repeating (a) to (c) steps for nearby line light sources of the light source at the shortest distance, wherein
in response to detection of ray increase or decrease of viewpoint information assigned to a viewpoint image index of the DVD corresponding to the pixel selected by backprojecting, updating viewpoint information by determining a new central viewpoint to reflect the increased or decreased viewpoint information and
assigning as many other viewpoint image indices as the designed viewpoints to left and right nearby pixels.

16. The method of claim 2, wherein the autostereoscopic display apparatus includes a system for tracking a face position or pupils of a viewer, and
a maximal viewing zone is dynamically formed based on a center of the viewer's face or a center between the viewer's two eyes provided by the system.

17. The method of claim 2, wherein the autostereoscopic display apparatus includes a system for tracking face positions or pupils of a plurality of viewers, and
a maximal viewing zone is dynamically formed based on an average depth-direction position of centers of the plurality of viewers' faces or centers between the viewers' two eyes provided by the system.

18. The method of claim 2, wherein the autostereoscopic display apparatus includes a system for tracking face positions or pupils a plurality of viewers, and
a maximal viewing zone is dynamically formed based on an average depth-direction position and an average horizontal position of centers of the plurality of viewers' faces or centers between the viewers' two eyes provided by the system.

19. The method of claim 3, wherein each of the 3D unit pixels represents pixels 1 to N formed viewing zones at the DVD through the parallax barrier, the lenticular lenses, or the line light sources as one unit.

20. The method of claim 7, wherein in response to detection of no pixel index is assigned, providing a viewpoint image of any one of 3D unit pixels adjacent to a pixel to the pixel.

21. The method of claim 7, in response to detection of no pixel index is assigned, providing a number of pixels constituting every $k^{th}$ 3D unit pixel by increasing one pixel per a pixel, and providing an additional viewpoint image to the increased pixel.

22. The method of claim 11, wherein in response to detection of the double pixel indices being assigned, assigning a viewpoint image of any one of 3D unit pixels adjacent to the pixel to the pixel.

23. The method of claim 11, wherein in response to detection of the double pixel indices being assigned, decreasing a number of pixels constituting every $k^{th}$ 3D unit pixel by one for the pixel.

24. The method of claim 10, wherein the rearranging of the viewpoint images comprises:
(a) selecting the pixel by backprojecting a ray passing through an aperture of the parallax barrier at a shortest distance from a horizontal center position of the DMVZ or a center of a lenticular lens at a shortest distance from the horizontal center position to a pixel of the display panel;
(b) assigning a central viewpoint of a viewpoint image index corresponding to the DVD to the selected pixel;
(c) configuring a 3D unit pixel by assigning as many other viewpoint image indices as designed viewpoints to left and right nearby pixels of the selected pixel to which the central viewpoint has been assigned; and
(d) processing by repeating (a) to (c) steps for nearby apertures of the aperture at the shortest distance from the parallax barrier or nearby lenticular lenses of the lenticular lens at the shortest distance, wherein
in response to detection of ray increase or decrease of viewpoint information assigned to a viewpoint image index of the DVD corresponding to the pixel selected by backprojecting, updating viewpoint information by determining a new central viewpoint to reflect the increased or decreased viewpoint information and
assigning as many other viewpoint image indices as the designed viewpoints to left and right nearby pixels.

25. The method of claim 11, wherein the rearranging of the viewpoint images comprises:
(a) selecting the pixel by backprojecting a ray passing through a center of a line light source at a shortest distance from a horizontal center position of the DMVZ to a pixel of the display panel and selecting the pixel;
(b) assigning a central viewpoint of a viewpoint image index corresponding to the DVD to the selected pixel;
(c) configuring a 3D unit pixel by assigning as many other viewpoint image indices as designed viewpoints to left and right nearby pixels of the selected pixel to which the central viewpoint has been assigned; and
(d) processing by repeating (a) to (c) steps for nearby apertures of the aperture at the shortest distance from the parallax barrier or nearby lenticular lenses of the lenticular lens at the shortest distance, wherein
in response to detection of ray increase or decrease of viewpoint information assigned to a viewpoint image index of the DVD corresponding to the pixel selected by backprojecting, updating viewpoint information by determining a new central viewpoint to reflect the increased or decreased viewpoint information and
assigning as many other viewpoint image indices as the designed viewpoints to left and right nearby pixels.

26. The method of claim 3, wherein the autostereoscopic display apparatus includes a system for tracking a face position or pupils of a viewer, and
a maximal viewing zone is dynamically formed based on a center of the viewer's face or a center between the viewer's two eyes provided by the system.

27. The method of claim 3, wherein the autostereoscopic display apparatus includes a system for tracking face positions or pupils of a plurality of viewers, and
a maximal viewing zone is dynamically formed based on an average depth-direction position of centers of the plurality of viewers' faces or centers between the viewers' two eyes provided by the system.

28. The method of claim 3, wherein the autostereoscopic display apparatus includes a system for tracking face positions or pupils a plurality of viewers, and
a maximal viewing zone is dynamically formed based on an average depth-direction position and an average horizontal position of centers of the plurality of viewers' faces or centers between the viewers' two eyes provided by the system.

* * * * *